United States Patent
Bliss et al.

(10) Patent No.: US 7,329,304 B2
(45) Date of Patent: Feb. 12, 2008

(54) PORTABLE OXYGEN CONCENTRATOR

(75) Inventors: Peter L. Bliss, Prior Lake, MN (US); Charles R. Atlas, Jr., Coto de Caza, CA (US); Scott Cameron Halperin, Orange, CA (US)

(73) Assignee: Respironics Oxytec, Inc., Murrysville, PA (US)

( * ) Notice: Subject to any disclaimer, the term of this patent is extended or adjusted under 35 U.S.C. 154(b) by 285 days.

(21) Appl. No.: 11/099,830

(22) Filed: Apr. 5, 2005

(65) Prior Publication Data
US 2006/0230929 A1    Oct. 19, 2006

(51) Int. Cl.
*B01D 53/053* (2006.01)
*C01B 13/02* (2006.01)

(52) U.S. Cl. .................. 95/12; 95/22; 95/130; 96/111; 96/113; 96/114; 96/121; 128/204.21; 128/204.22; 128/204.26

(58) Field of Classification Search .............. 96/109, 96/111, 113, 114, 115, 121; 95/8, 12, 19, 95/22, 130; 128/204.18, 204.21, 205.12, 128/205.24, 204.26, 204.22
See application file for complete search history.

(56) References Cited

U.S. PATENT DOCUMENTS

| | | |
|---|---|---|
| 4,302,224 A | 11/1981 | McCombs |
| 4,342,573 A | 8/1982 | McCombs |
| 4,378,982 A | 4/1983 | McCombs |
| 4,457,303 A | 7/1984 | Durkan |
| 4,491,459 A | 1/1985 | Pinkerton |
| 4,502,873 A | 3/1985 | Mottram |
| 4,509,959 A | 4/1985 | McCombs |
| 4,511,377 A | 4/1985 | McCombs |
| 4,537,606 A | 8/1985 | Itoh et al. |
| 4,561,865 A | 12/1985 | McCombs |
| 4,576,616 A | 3/1986 | Mottram |
| 4,681,099 A | 7/1987 | Sato |

(Continued)

FOREIGN PATENT DOCUMENTS

JP    2005-058469 A    *    3/2005

(Continued)

OTHER PUBLICATIONS

International Search Report for PCT/US2006/012792, Applicant Oxytec Medical Corporation, Forms PCT/ISA/210, Aug. 30, 2006.

*Primary Examiner*—Frank M. Lawrence
(74) *Attorney, Agent, or Firm*—Michael W. Haas

(57) ABSTRACT

A portable oxygen concentrator includes a pair of sieve beds having first and second ends, a compressor for delivering air to the first ends of the sieve beds, a reservoir communicating with the second ends of the sieve beds, and an air manifold attached to the first ends of the sieve beds. The air manifold includes passages therein communicating with the compressor and the first ends of the sieve beds. A set of valves is coupled to the air manifold, and a controller is coupled to the valves for selectively opening and closing the valves to alternately charge and purge the sieve beds to deliver concentrated oxygen into the reservoir. An oxygen delivery manifold communicates with the second ends of the sieve beds for delivering oxygen from the reservoir to a user. Pressure sensors may be provided in the reservoir and/or delivery line for controlling operation of the controller.

36 Claims, 9 Drawing Sheets

U.S. PATENT DOCUMENTS

| | | | |
|---|---|---|---|
| 4,784,130 A | 11/1988 | Kenyon | |
| 4,802,899 A | 2/1989 | Vrana | |
| 4,826,510 A | 5/1989 | McCombs | |
| 4,892,566 A | 1/1990 | Bansal | |
| D311,061 S | 10/1990 | Vrana | |
| 4,971,609 A | 11/1990 | Pawlos | |
| 4,973,339 A | 11/1990 | Bansal | |
| 5,024,219 A | 6/1991 | Dietz | |
| 5,071,449 A | 12/1991 | Sircar | |
| 5,203,887 A | 4/1993 | Toussaint | |
| 5,268,021 A | 12/1993 | Hill | |
| 5,340,381 A * | 8/1994 | Vorih | 95/21 |
| 5,370,728 A | 12/1994 | LaSala | |
| RE35,099 E | 11/1995 | Hill | |
| 5,474,595 A | 12/1995 | McCombs | |
| 5,518,526 A | 5/1996 | Baksh | |
| 5,531,807 A | 7/1996 | McCombs | |
| 5,578,115 A * | 11/1996 | Cole | 96/121 |
| 5,593,478 A * | 1/1997 | Hill et al. | 96/111 |
| 5,658,371 A | 8/1997 | Smolarek | |
| 5,711,787 A | 1/1998 | Neill | |
| 5,735,268 A | 4/1998 | Chua | |
| 5,746,806 A | 5/1998 | Aylsworth | |
| 5,827,358 A * | 10/1998 | Kulish et al. | 96/115 |
| 5,871,564 A | 2/1999 | McCombs | |
| 5,871,565 A | 2/1999 | Leavitt | |
| 5,893,944 A | 4/1999 | Dong | |
| 6,176,897 B1 * | 1/2001 | Keefer | 95/98 |
| 6,186,477 B1 | 2/2001 | McCombs | |
| 6,190,441 B1 * | 2/2001 | Czabala et al. | 96/130 |
| 6,302,107 B1 * | 10/2001 | Richey et al. | 128/205.18 |
| 6,314,957 B1 | 11/2001 | Boissin | |
| 6,346,139 B1 | 2/2002 | Czabala | |
| 6,348,082 B1 * | 2/2002 | Murdoch et al. | 95/22 |
| 6,393,802 B1 | 5/2002 | Bowser | |
| 6,427,690 B1 | 8/2002 | McCombs | |
| 6,446,630 B1 | 9/2002 | Todd, Jr. | |
| 6,475,265 B1 | 11/2002 | Baksh | |
| 6,478,850 B1 | 11/2002 | Warren | |
| 6,514,319 B2 | 2/2003 | Keefer | |
| 6,520,176 B1 | 2/2003 | Dubois | |
| 6,547,851 B2 | 4/2003 | Warren | |
| 6,551,384 B1 | 4/2003 | Ackley | |
| 6,558,451 B2 | 5/2003 | McCombs | |
| 6,651,658 B1 | 11/2003 | Hill | |
| 6,691,702 B2 | 2/2004 | Appel | |
| 6,712,087 B2 | 3/2004 | Hill | |
| 6,764,534 B2 | 7/2004 | McCombs | |
| 6,802,889 B2 | 10/2004 | Graham | |
| 6,832,900 B2 | 12/2004 | Leu | |
| 6,923,180 B2 * | 8/2005 | Richey et al. | 128/205.12 |
| D510,169 S | 9/2005 | Deane | |
| 2003/0005928 A1 * | 1/2003 | Appel et al. | 128/202.26 |
| 2005/0072298 A1 | 4/2005 | Deane | |
| 2005/0072306 A1 | 4/2005 | Deane | |
| 2005/0072423 A1 | 4/2005 | Deane | |
| 2005/0072426 A1 | 4/2005 | Deane | |
| 2005/0103341 A1 * | 5/2005 | Deane et al. | 128/204.26 |
| 2005/0257686 A1 | 11/2005 | Oochialini | |
| 2005/0274381 A1 | 12/2005 | Deane | |

FOREIGN PATENT DOCUMENTS

| | | |
|---|---|---|
| WO | WO9807082 | 2/1998 |
| WO | WO0245821 | 6/2002 |
| WO | WO03090903 | 11/2003 |
| WO | WO2004054493 | 7/2004 |

* cited by examiner

PORTABLE OXYGEN CONCENTRATOR

FIELD OF THE INVENTION

The present invention relates generally to apparatus and methods for providing oxygen, and, more particularly, to portable apparatus for concentrating oxygen by adsorption from air and methods for using such apparatus.

BACKGROUND

Lung diseased patients often need supplemental oxygen to improve their comfort and/or quality of life. Stationary sources of oxygen are available, e.g., oxygen lines in hospitals or other facilities, that may provide oxygen to patients. To allow some mobility, cylinders of pure and/or concentrated oxygen can be provided that a patient may carry or otherwise take with them, e.g., on pull-along carts. Such cylinders, however, have limited volume and are large and heavy, limiting the patient's mobility.

Portable devices have been suggested that concentrate oxygen from ambient air to provide supplemental oxygen. For example, pressure swing adsorption ("PSA") apparatus are known that separate nitrogen from ambient air, delivering a stream of concentrated oxygen that may be stored in a tank or delivered directly to patients. For example, U.S. Pat. Nos. 5,531,807 6,520,176, and 6,764,534 disclose portable PSA oxygen concentrators.

Accordingly, apparatus and methods for providing oxygen would be useful.

SUMMARY

The present invention is directed generally to apparatus and methods for providing oxygen. More particularly, the present invention is directed to portable pressure swing adsorption ("PSA") apparatus for concentrating oxygen and methods for using such apparatus.

In accordance with one embodiment, a portable oxygen concentrator is provided that includes a plurality of sieve beds comprising air inlet/outlet ends and oxygen inlet/outlet ends, a purge orifice communicating continuously between the oxygen inlet/outlet ends of the sieve beds; a reservoir communicating with the oxygen inlet/outlet ends of the sieve beds, a compressor for delivering air to the air inlet/outlet ends of the sieve beds, a set of valves between the compressor and the air inlet/outlet ends of the sieve beds, and a controller coupled to the valves for selectively opening and closing the valves to alternately charge and purge the sieve beds, wherein oxygen passes from a sieve bed being charged to a sieve bed being purged via the purge orifice to assist evacuating nitrogen from the sieve bed being purged.

In another embodiment, a method is provided for concentrating oxygen using a portable apparatus including a plurality of sieve beds including first and second ends, a reservoir communicating with the second ends of the sieve beds, a compressor, and a set of valves between the compressor and the first ends of the sieve beds. The method may include selectively opening and closing the valves to alternately charge and purge the sieve beds, wherein oxygen passes from a sieve bed being charged to a sieve bed being purged via a purge orifice to assist evacuating nitrogen from the sieve bed being purged.

In yet another embodiment, a method is provided for concentrating oxygen using a portable apparatus including first and second sieve beds, each including first and second ends, a reservoir communicating with the second ends of the sieve beds, a compressor, and a set of valves disposed between the compressor and the first ends of the sieve beds. The method may include opening a first subset of the valves to charge the first sieve bed to cause oxygen to exit from the first sieve bed into the reservoir and purge the second bed, opening a second subset of the valves to charge the second sieve bed to cause oxygen to exit from the second sieve bed into the reservoir and purge the first sieve bed, and opening a third subset of the valves between opening the first and second subsets of the valves to deliver air simultaneously into the first and second sieve beds. Optionally, the third subset may include one or more of the valves in the first and/or second subsets depending upon the configuration and/or number of valves provided.

In still another embodiment, a portable oxygen concentrator is provided that includes a plurality of sieve beds, each sieve bed comprising an air inlet/outlet end and a oxygen inlet/outlet end, a reservoir communicating with the oxygen inlet/outlet ends of the sieve beds for storing oxygen exiting from the sieve beds, a pressure sensor for measuring reservoir pressure within the reservoir, a compressor for delivering air to the air inlet/outlet ends of the sieve beds, a set of valves between the compressor and the air inlet/outlet ends of the sieve beds, and a controller coupled to the valves for selectively opening and closing the valves to alternately charge the first sieve bed while purging the second sieve bed, and charge the second sieve bed while purging the first sieve bed. The controller is coupled to the pressure sensor for monitoring the reservoir pressure, and the controller is configured for adjusting a duration that the first and second sieve beds are purged based upon the reservoir pressure.

In accordance with yet another embodiment, a portable oxygen concentrator is provided that includes a plurality of sieve beds air inlet/outlet ends and oxygen inlet/outlet ends, a reservoir communicating with oxygen inlet/outlet ends of the sieve beds, a compressor for delivering air to the air inlet/outlet ends of the sieve beds, an air manifold defining a plurality of passages therein communicating with the compressor and the air inlet/outlet ends of the sieve beds, a set of valves coupled to the air manifold, and a controller coupled to the valves for selectively opening and closing the valves to alternately charge and purge the sieve beds by evacuating pressurized nitrogen from the sieve beds through passages in the air manifold.

In yet another embodiment, a portable oxygen concentrator is provided that includes a plurality of sieve beds including air inlet/outlet ends and oxygen inlet/outlet ends, a reservoir communicating with the oxygen inlet/outlet ends of the sieve beds, a compressor for delivering air to the air inlet/outlet ends of the sieve beds, an air manifold attached to the air inlet/outlet ends of the sieve beds, the air manifold including a plurality of passages therein communicating with the compressor and the air inlet/outlet ends of the sieve beds, a set of valves coupled to the air manifold, a controller coupled to the valves for selectively opening and closing the valves to alternately charge the sieve beds by delivering compressed air into the sieve beds through the passages in the air manifold and purge the sieve beds by evacuating pressurized nitrogen from the sieve beds through passages in the air manifold, and an oxygen delivery manifold attached to the oxygen inlet/outlet ends of the sieve beds, the oxygen delivery manifold including at least one passage therein communicating with the reservoir for delivering oxygen from the reservoir to a user.

Optionally, the portable oxygen concentrator may include a side wall extending between the air manifold and the oxygen delivery manifold, whereby the sieve beds, the air manifold, the oxygen delivery manifold, and the side wall provide a structural frame for the apparatus.

In still another embodiment, a portable oxygen concentrator is provided that includes a pair of sieve beds including air inlet/outlet ends and oxygen inlet/outlet ends, a reservoir nested at least partially between the sieve beds and communicating with oxygen inlet/outlet ends of the sieve beds, a compressor for delivering air to the air inlet/outlet ends of the sieve beds, and an air manifold defining a plurality of passages therein communicating with the compressor and the air inlet/outlet ends of the sieve beds.

In yet another embodiment, a portable oxygen concentrator is provided that includes a plurality of sieve beds including first and second sieve beds, a compressor for delivering air to the sieve beds, a set of control valves between the compressor and the sieve beds, and a reservoir communicating with the sieve beds for storing oxygen exiting from the sieve beds. A first pressure sensor may measure reservoir pressure within the reservoir, a delivery valve may communicate with the reservoir, and a second pressure sensor may measure a pressure drop across the delivery valve. A controller may be coupled to the control valves for selectively opening and closing the valves to alternately charge and purge the first and second sieve beds, and may be coupled to first and second pressure sensors for selectively opening the delivery valve for predetermined pulse durations to deliver pulses of gas from the reservoir to a user. The controller may adjust the pulse durations based at least partially upon the reservoir pressure and the pressure drop across the delivery valve.

Other aspects and features of the present invention will become apparent from consideration of the following description taken in conjunction with the accompanying drawings.

DETAILED DESCRIPTION

Figure 1A:
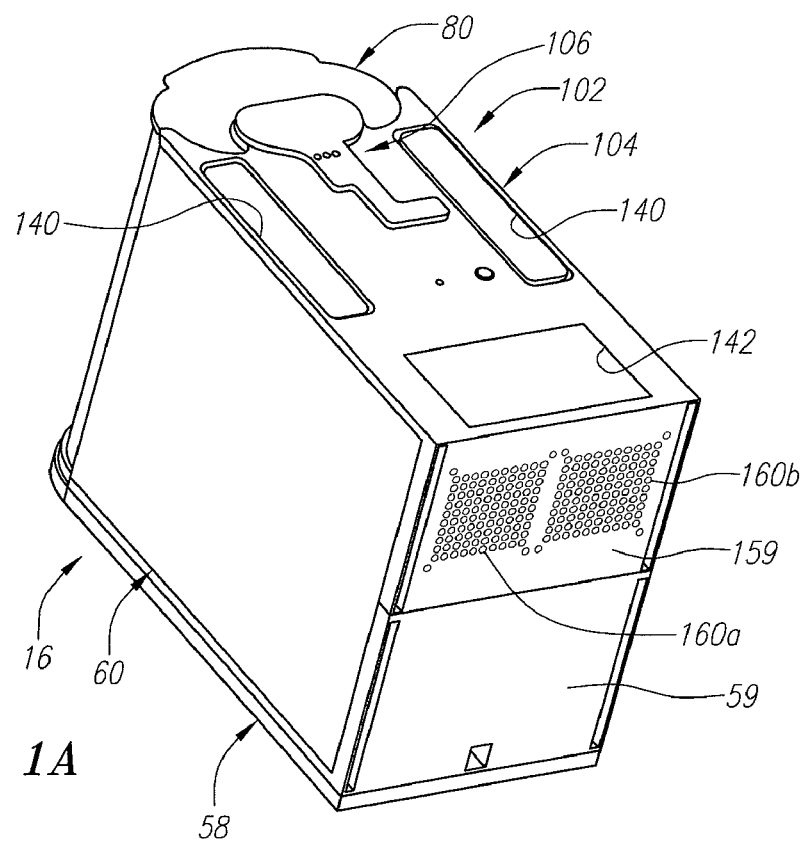
FIGS. 1A and 1B are perspective top and bottom views, respectively, of a first embodiment of a portable oxygen concentrator apparatus.

Turning to the drawings, FIGS. 1A-3 show a first embodiment of a portable oxygen concentrator apparatus 10. Generally, the apparatus 10 includes a plurality of sieve beds or tanks 12, a compressor 14, a lower or air manifold 16 defining a plurality of passages 62-68 therein, a storage tank or reservoir 18, a set of air control valves 20 for creating one or more flow paths through the passages 62-68 within the air manifold 16, and an upper or oxygen delivery manifold 102. A controller 22 may be coupled to the air control valves 20 for selectively opening and closing the air control valves 20 to control airflow through the air manifold 16, and, consequently, through the sieve beds 12. Optionally, the apparatus 10 may include one or more additional components, e.g., one or more check valves, filters, sensors, electrical power sources (not shown), and/or other components, at least some of which may be coupled to the controller 22 (and/or one or more additional controllers, also not shown), as described further below. It will be appreciated that the terms "airflow," "air," or "gas" may be used generically herein, even though the particular fluid involved may be ambient air, pressurized nitrogen, concentrated oxygen, and the like.

Figure 4:
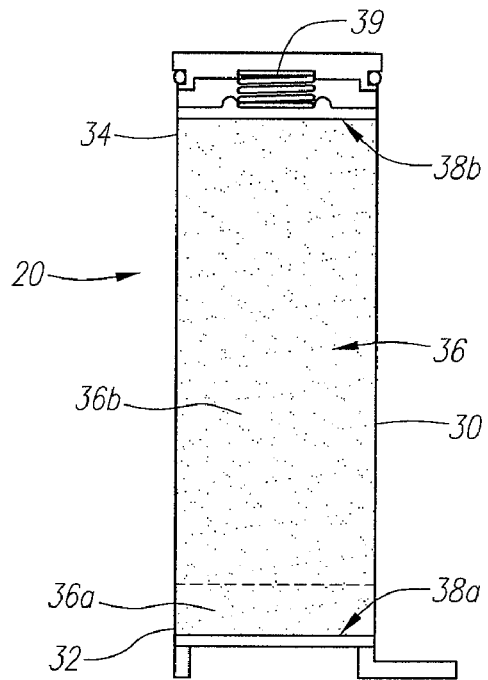
FIG. 4 is a cross-section of an exemplary sieve bed that may be included in the apparatus of FIGS. 1A and 1B.

Turning to FIG. 4, each sieve bed 12 includes an outer casing 30, e.g., in the shape of an elongate hollow cylinder, including a first or air inlet/outlet end 32 and a second or oxygen inlet/outlet end 34. The casing 30 may be formed from substantially rigid material, e.g., plastic, such as acrylonitrile butadiene styrene ("ABS"), polycarbonate, and the like, metal, such as aluminum, or composite materials. In exemplary embodiments, the casing 30 may have a diameter between about two and ten centimeters (2-10 cm), and a length between about eight and thirty centimeters (8-30 cm). Although the casing 30 is shown having a round cylindrical shape, it will be appreciated that the casing 30 may have other desired shapes, e.g., that may depend upon spatial, performance, and/or structural criteria. For example, the casing 30 may have an elliptical, square, rectangular, or other regular or irregular polygonal shaped cross-section (not shown).

The casing 30 may be at least partially filled with filtration media or sieve material 36 to provide a sieve bed 12 capable of adsorbing nitrogen from air delivered into the sieve bed 12 under pressure. To hold the sieve material 36 within the casing 30, the sieve bed 12 may include discs or plates 38 adjacent each of the first and second ends 32, 34 of the casing 30. The plates 38 may be spaced apart from one another to define a desired volume between the plates 38 and within the casing 30. For example, the desired volume may be between about one hundred fifty and six hundred cubic centimeters (150-600 cm$^3$), which may be filled with sieve material 36. In an exemplary embodiment, the volume of sieve material 36 within the sieve bed 12 may be about forty four cubic inches (44 in$^3$), as explained further below.

The plates 38 may include one or more openings or pores (not shown) therethrough to allow airflow through the plates 38. For example, the plates 38 may be formed from sintered plastic, thereby providing pores within the plastic material smaller than the grain size of the sieve material 36 that allow airflow through the plates 38. Alternatively, the plates 38 may be formed from plastic, metal, or composite materials having multiple holes or pores formed therethrough. For example, the holes may be created when the plates 38 are formed, e.g., by molding the plates 38 and holes simultaneously. In another alternative, the plates 38 may be formed as solid panels, e.g., cut from stock, molded, etc., and the holes may be created through the panels, e.g., by drilling, laser cutting, and the like.

Generally, the sieve bed 12 may be filled such that there are no substantial voids in the sieve material 36, e.g., such that the sieve material 36 is substantially packed between the plates 38. The resulting sieve bed 12 may weigh between about 0.25-1.50 pounds.

In the embodiment shown, the lower plate 38a is substantially stationary, e.g., fixed to the first end 32 of the casing 30, e.g., by one or more cooperating connectors or fasteners (not shown), adhesives, sonic welding, and the like. The upper plate 38b may be disposed adjacent the second end 34, yet movable within the casing 30. For example, the upper plate 38b may be biased towards the lower plate 38a, e.g., by a spring or other biasing mechanism 39, which may compress the sieve material 36 between the plates 38. If the sieve material 36 settles or somehow escapes from the sieve bed 12, the upper plate 38b may automatically to move downwardly towards the lower plate 38a to maintain the sieve material 36 under a desired compression. This compression may prevent the sieve material 36 from moving into other areas of the apparatus 10 when it has become powderized from operation and/or may counteract flow-induced forces that may otherwise cause the sieve material 36 to fluidize.

The porosity of the plates 38 may be substantially uniform across the cross-section of the sieve bed 12, e.g., to ensure that flow into and/or out of the sieve bed 12 is substantially evenly distributed across the area of the first and second ends 32, 34. Alternatively, the porosity of the plates 38 may be varied in a desired pattern, or only a portion of the plates 38 may be porous. In yet another alternative, the plates 38 may have a solid wall and may include one or more openings therethrough, e.g., in a desired pattern.

The sieve material 36 may include one or more known materials capable of adsorbing nitrogen from pressurized ambient air, thereby allowing oxygen to be bled off or otherwise evacuated from the sieve bed 12. Exemplary sieve materials that may be used include synthetic zeolite, LiX, and the like, such as UOP Oxysiv 5, 5A, Oxysiv MDX, or Zeochem Z10-06. It may be desirable to provide multiple layers of sieve material 36 within the sieve bed 12, e.g., providing sieve material with different properties in layers between the first end 32 and the second end 34.

For example, because sieve material generally absorbs water, which may cause some sieve material to deteriorate, sieve material may be provided at the first end 32 that is capable of absorbing water without substantially impacting its durability and/or ability to adsorb nitrogen. In an exemplary embodiment, a first layer 36a may be provided adjacent the first end 32 having a depth (dimension parallel to the length of the sieve beds 12) between about ten and thirty percent of the overall height of sieve material, such as Oxysiv 5 material. A second layer 36b may then be provided that includes a high performance adsorption material, such as Oxysiv MDX. The second layer 36b may substantially fill the remainder of the sieve bed 12, as shown, or one or more additional layers of sieve material may be provided (not shown) having desired properties. Thus, during use, when ambient air enters the first end 32 of the sieve bed 12, the first layer 36a may substantially absorb moisture in the air such that the second layer 36b is exposed to relatively dry air, thereby substantially reducing the risk of damaging the sieve material of the second layer 36b. It has been determined for Oxysiv MDX that between about 0.5-1.5 pounds, and preferably about one pound, of this sieve material per liter per minute (lpm) outlet production provides efficient adsorption.

Although two sieve beds 12 are shown in FIGS. 1A-3, it will be appreciated that one or more sieve beds may be provided, e.g., depending upon the desired weight, performance efficiency, and the like. Additional information on sieve beds and/or sieve materials that may be included in the apparatus 10 may be found in U.S. Pat. No. 4,859,217, the entire disclosure of which is expressly incorporated by reference herein.

Figure 1B:
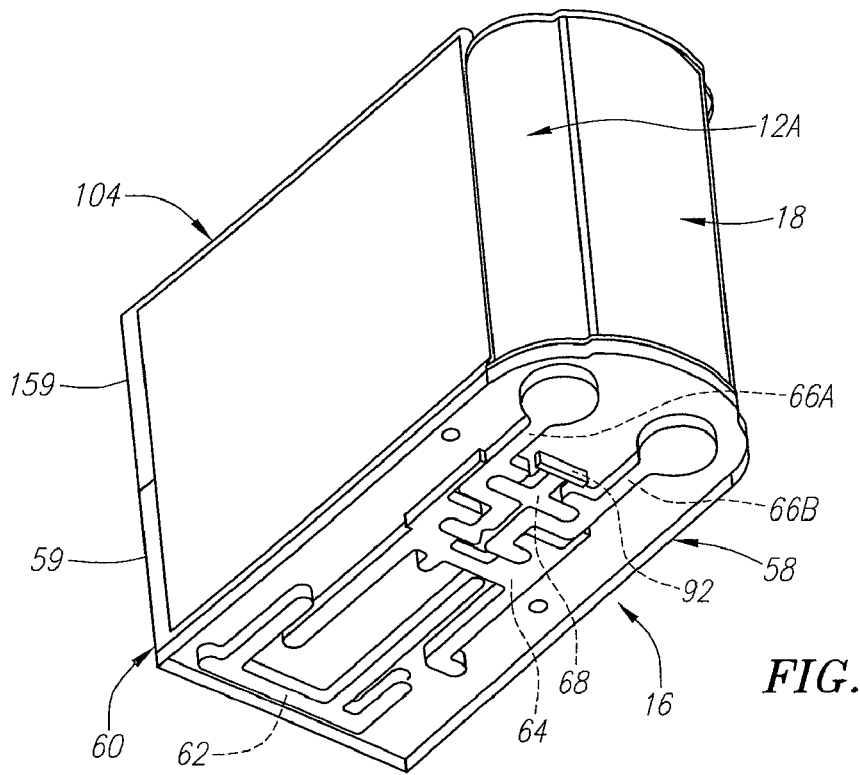

Returning to FIGS. 1A, 1B, and 2, the reservoir 18 may include an elongate tubular casing 70 having a lower or first end 94, which may be substantially enclosed or open, and an upper or second end 96, which may also be substantially enclosed or open (e.g., if capped by a manifold or other component, as described elsewhere herein). As shown, the casing 70 has an irregular hourglass shape allowing the reservoir 18 to be nested between and/or adjacent to the sieve beds 12. This may minimize the space occupied by the reservoir 18, which may help reduce the overall size of the apparatus 10. In addition, the casing 70 may have a curved outer wall 71 that may extend between the sieve beds 12, which may provide a finished outer surface for the apparatus 10, as best seen in FIGS. 1A and 1B. The casing 70 may be formed from plastic, such as ABS, polycarbonate, and the like, metal, such as aluminum, or composite materials, similar to the other components of the apparatus 10 described herein.

As shown in FIGS. 2 and 9A-9C, a cap 80 may be provided to at least partially close the upper end 96 of the casing 70. The cap 80 may be substantially permanently or removably attached to the second ends 34 of the sieve beds 12 and/or the upper end 96 of the reservoir 18, e.g., using one or more connectors, fasteners, adhesives, sonic welding, and the like. The cap 80 may include one or more openings 82, 84 therein for allowing oxygen to flow into and out of the sieve beds 12 and/or reservoir 18, as explained further below.

Figure 9A:
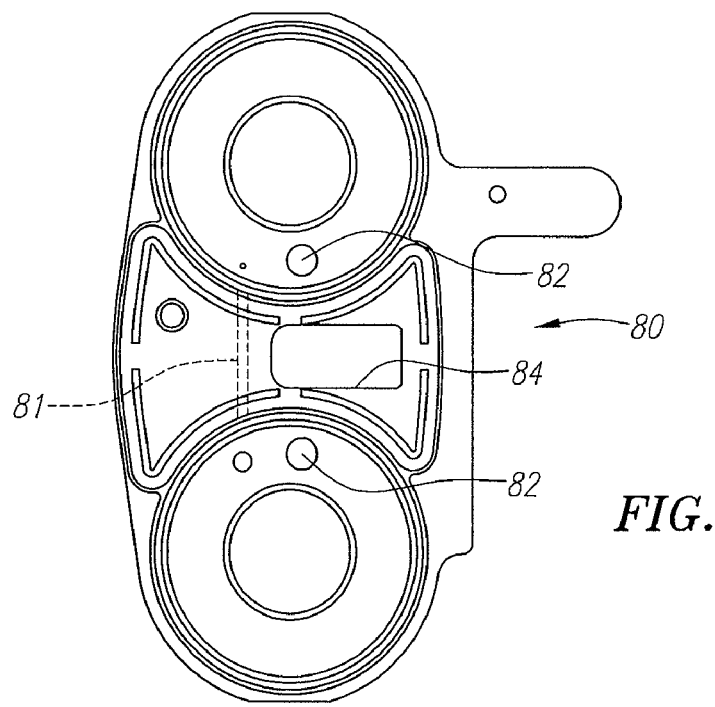
FIGS. 9A-9C are bottom, side, and top views, respectively, of a sieve bed cap that may be part of the apparatus of FIGS. 1A and 1B.
Figure 9B:
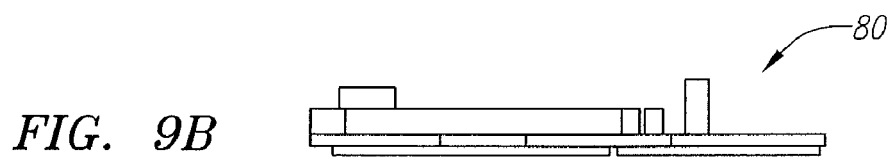
Figure 9C:
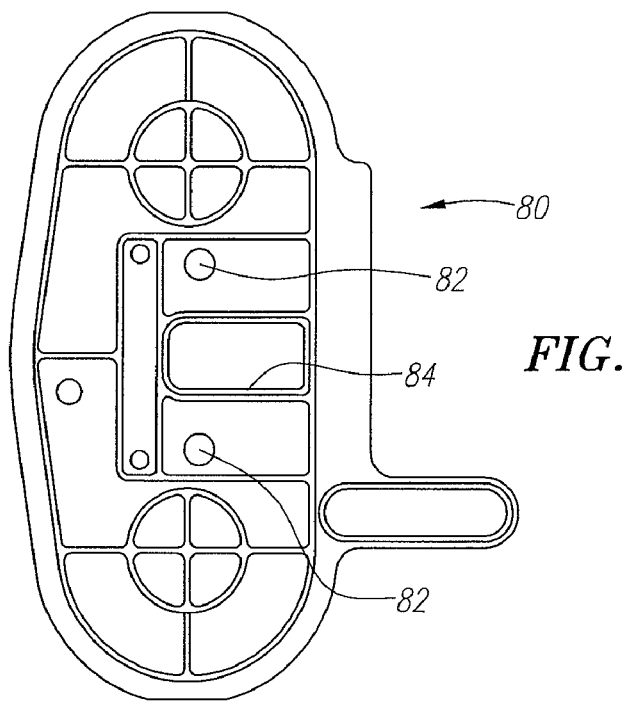

Turning to FIG. 9A, the cap 80 may also include a purge orifice 81 (shown in phantom), which may provide a passage communicating directly between the seconds ends 34 of the sieve beds 12. The purge orifice 81 may remain continuously open, thereby providing a passage for oxygen to pass from one sieve bed 12 to the other, e.g., while the one sieve bed 12 is charging and the other is purging, as described further below. The purge orifice 81 may have a precisely determined cross-sectional size, e.g., between about 0.015-0.35 inch, or about 0.020 inch diameter, which may be based upon one or more flow or other performance criteria of the sieve beds 12, as explained further below. For example, the purge orifice 81 may be sized such that between about two and a half and ten liters per minute (lpm) of oxygen, e.g., about five liters per minute (5 lpm), flows through the purge orifice 81 in either direction at a pressure differential of about five pounds per square inch (5 psi) across the purge orifice 81.

Alternatively, the purge orifice may extend between the sieve beds 12 via the reservoir 18. For example, the purge orifice may include a first passage (not shown) extending along the cap 80 that communicates between the sieve bed 12a and the reservoir 18, and a second passage (also not shown) extending along the cap 80 that communicates between the sieve bed 12b and the reservoir 18.

Optionally, if the lower end 94 of the casing 70 is open, a cap (not shown) may also be provided for substantially closing the lower end 94 of the casing 70, e.g., that may be substantially permanently or removably attached to the lower end 94, similar to the cap 80. Alternatively, the lower end 94 of the casing 70 may be open and the lower end 94 of the casing 70 may be enclosed by a portion of the air manifold 16, e.g., when the reservoir 18 is mounted onto or adjacent the air manifold 16, as described further below.

In a further alternative, the apparatus 10 may include multiple reservoirs (not shown) that may be provided at one or more locations within the apparatus 10, e.g., placed in different locations where space is available, yet minimizing the overall size of the apparatus 10. The reservoirs may be connected to one another via one or more flexible tubes (not shown) and/or via the oxygen delivery manifold 102 to allow oxygen to be delivered to and withdrawn from the reservoirs. Optionally, in this alternative, one or more valves may be provided for controlling flow of oxygen into and out of the reservoirs.

In addition or alternatively, the apparatus 10 may include one or more flexible reservoirs, e.g., bags or other containers that may expand or contract as oxygen is delivered into or out of them. The reservoirs may have predetermined shapes as they expand or more expand elastically to fill available space within the apparatus 10. Optionally, one or more rigid reservoirs may be provided that communicate with one or more flexible reservoirs (not shown), e.g., to conserve space within the apparatus 10. In further alternatives, one or more reservoirs may be provided as portions of one or both of the air manifold 16 and the oxygen delivery manifold 102, rather than as a separate component.

Figure 5:
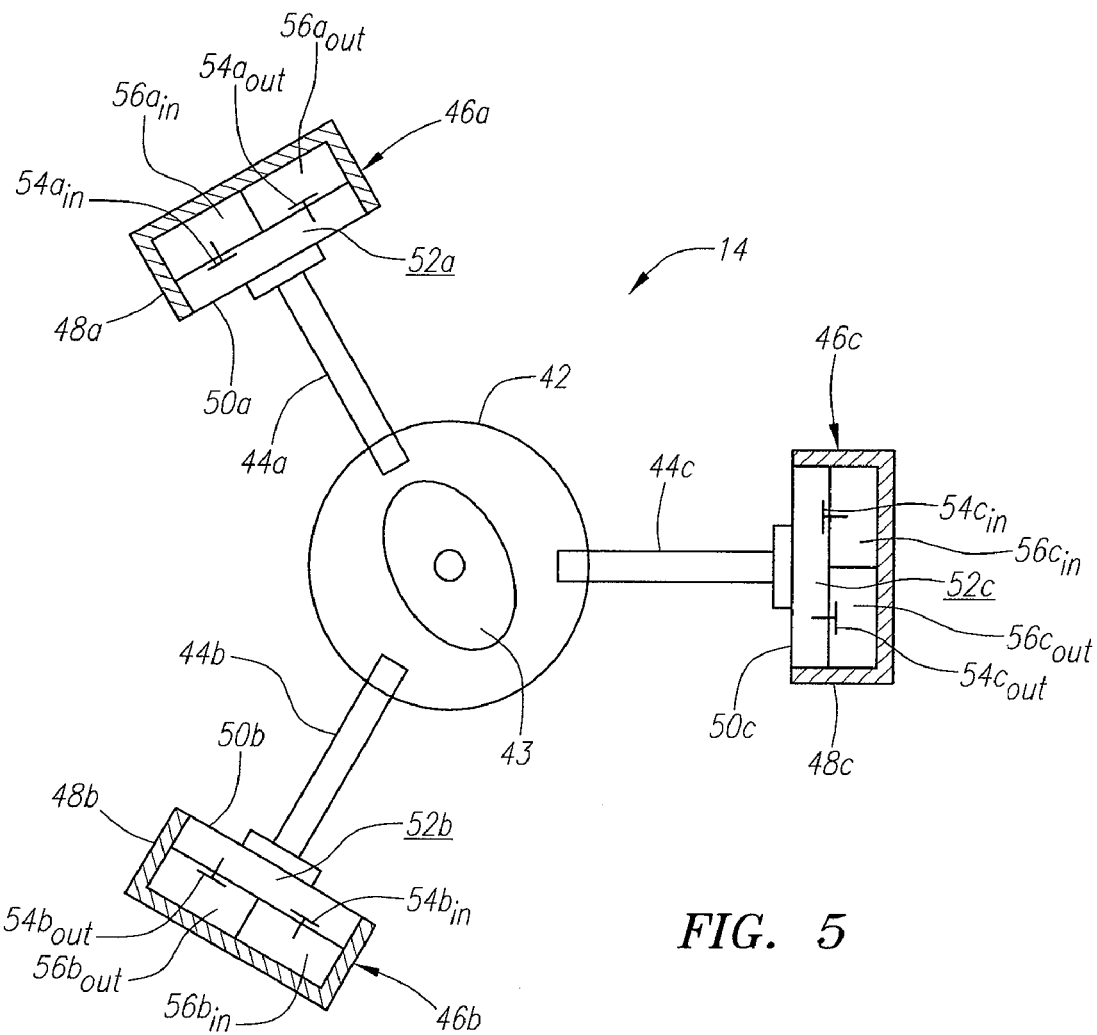
FIG. 5 is a top cross-sectional view of a compressor that may be included in the apparatus of FIGS. 1A and 1B.

Returning to FIGS. 1A, 1B, and 2, with additional reference to FIG. 5, the compressor 14 may be any device capable of drawing ambient air into the apparatus 10 and compressing the air to one or more desired pressures for delivery to the sieve beds 12. In the embodiment shown, the compressor 14 is a multiple headed device that includes a motor 40, a cam assembly 42 coupled to the motor 40, drive shafts or rods 44 coupled to the cam assembly 40, and a plurality of diaphragm assemblies or heads 46 coupled to the drive shafts 44. The motor 40 may be a brushless DC motor, such as the Pittman 4413.

As best seen in FIG. 5, each of the diaphragm assemblies 46 includes a housing 48, a diaphragm 50 secured to the housing 48 to define a chamber 52, and a set of check valves 54 for allowing air to be drawn into and forced out of the chamber 52. The housing 48 may include one or more substantially rigid parts providing a support structure for the diaphragm 50 and at least partially defining the chamber 52. The housing 48 may be formed from plastic, such as ABS or polycarbonate, metal, or composite materials, e.g., made by molding, casting, machining, and the like.

The diaphragm 50 may be substantially permanently or removably attached to the housing 48, e.g., using an interference fit, one or more connectors, fasteners adhesives, and the like (not shown), that may provide a substantially airtight seal between the diaphragm 50 and the housing 48. The diaphragm 50 may be formed from flexible or semi-rigid material that may repeatedly deflected a desired distance during operation of the compressor 14, e.g., Ethylene Propylene Diene Monomer ("EPDM") or "BUNA" rubber (synthetic rubber made by polymerizing butadiene), and the like, VITON, or liquid silicone rubber ("LSR") materials having sufficient flexibility, resiliency, and/or other appropriate properties.

In exemplary embodiments, the housing 48 and diaphragm 50 may have square or rectangular cross-sections (extending into the page of FIG. 5), e.g., between about one and three inches (1-3 in) on a side. The housing 48 may have a depth between about 0.25-1.5 inches, thereby providing a chamber 52 defining a volume. In an exemplary embodiment, the diaphragm assemblies 46 may have a square cross-section with each of the height and width being about two inches (50 mm). It will be appreciated, however, that the housing 48 and diaphragm 50 may have other cross-sectional shapes, e.g., circular, elliptical, and the like.

The diaphragm 50 may be coupled to the drive shaft 44, e.g., by a head 45, such that the diaphragm 50 may move inwardly and outwardly relative to the chamber 54 as the drive shaft 44 reciprocates along its longitudinal axis away from and towards the cam assembly 42. Thus, the volume of the chamber 54 may be increased and decreased as the diaphragm 50 moves away from and towards the chamber 54 to draw air into the chamber 54 and force air out of the chamber 54, respectively.

Optionally, as shown in FIG. 5, the housing 48 may include one more partitions defining passages, e.g., an inlet passage $56_{in}$ and an outlet passage $56_{out}$. As explained further below, the inlet and outlet passages $56_{in}$, $56_{out}$ may communicate with respective passages 62, 64 in the air manifold 16, e.g., via ports 57 (not shown in FIG. 5, see, e.g., FIG. 2) on the bottom of the housing 48. An inlet check valve $54_{in}$ may be provided in line with the inlet passage $56_{in}$, e.g., in the partition between the chamber 52 and the inlet passage $56_{in}$. The inlet check valve $54_{in}$ may open when exposed to a negative pressure within the chamber 52, i.e., as the diaphragm 50 is directed away from the chamber 52, and may close when exposed to a positive pressure within the chamber 52, i.e., as the diaphragm 50 is directed towards the chamber 52. Similarly, an outlet check valve $54_{out}$ may be provided in line with the outlet passage $56_{out}$ that may open when exposed to a positive pressure within the chamber 52 and close when exposed to a negative pressure within the chamber 52. The check valves 54 may simply be spring biased valves that open in one direction depending upon the pressure differential across the valve, such as conventional umbrella-type valves.

During operation, the motor 40 may be continuously or selectively activated to rotate a cam 43 of the cam assembly 42 and thereby cause the drive shafts 44 to reciprocate axially away from and towards the cam assembly 42. For example, the cam assembly 42 may be configured such that the drive shafts 44 have a total axial displacement of between about three and thirteen millimeters (3-13 mm). This reciprocation causes the diaphragms 50 to move in and out relative to the housings 46, thereby drawing ambient air into the chambers 52 via the inlet passages $56_{in}$ and forcing compressed air out of the chambers 52 via the outlet passages $56_{out}$. The displacement of the center of the diaphragm 50 may correspond one-to-one with the displacement of the drive shafts 44. The drive shafts 44 may change the volume of the chamber 52, e.g., by between about eighty and ninety five percent (80-95%) above and below its relaxed volume (when the diaphragm 50 is substantially relaxed or not subjected to any forces).

In an exemplary embodiment, the reciprocal movement of the drive shafts 44 is staggered or offset in time for each of the diaphragm assemblies 46a-46c in a predetermined pattern, e.g., based upon the configuration of the cam 43 of the cam assembly 42. Thus, compressed air may be generated sequentially by each of the heads 46. This may also minimize the amount of vibration or noise generated by the compressor 14, e.g., such that vibration or movement of one of the diaphragm assemblies 46 at least partially offsets the others. Additional information regarding operation and control of the compressor 14 is provided below.

In addition, because the diaphragm assemblies may be angularly offset from one another, e.g., by one hundred twenty degrees (120°) when disposed symmetrically about the cam assembly 42, this may also offset or minimize vibrations created during operation of the compressor 14. By comparison, in an alternative embodiment, two diaphragm assemblies (not shown) may be provided on opposite sides of the cam assembly in a linear configuration defining an axis, although this a configuration may increase vibrations along the axis.

Alternatively, more than three (3) heads may be provided, although this may increase the cost and/or complexity of operation of the apparatus 10. In order to minimize vibration, it may be desirable to provide an odd number of diaphragm assemblies (e.g., three, five, seven, etc.), e.g., in a symmetrical spoke configuration that does not create a linear axis between any of the diaphragm assemblies, which may at least partially offset vibrations between the various heads.

Turning to FIGS. 2 and 5A-6B, the lower or air manifold 16 generally includes one or more substantially planar structures defining a plurality of passages 62-68 therein. Generally, the air manifold 16 is sealed such that the passages 62-68 are substantially airtight other than at openings 72-79, 86-90. The openings 72-79, 86-90 may allow other components, e.g., the compressor 14, the sieve beds 18, and air control valves 20, to communicate with the passages 62-68 for moving air through the air manifold 16 in a desired manner, as explained further below. Optionally, the air manifold 16 may include one or more holes, pockets, and the like for receiving mounts, connectors, and/or fasteners (not shown), e.g., for attaching components of the apparatus 10 to the air manifold 16, e.g., the sieve beds 12, the compressor 14, reservoir 18, and/or air control valves 20.

The air manifold 16 may be substantially rigid, e.g., thereby providing or enhancing a structural integrity of the apparatus 10. In one embodiment, the air manifold 16 may define one or more outer structural surfaces for the apparatus 10, e.g., a lower or bottom surface of the apparatus 10, thereby eliminating the need for an additional lower exterior skin. The air manifold 16 may be formed from any engineering grade material, e.g., plastic, such as ABS, polycarbonate, and the like; metal, such as aluminum, and the like; or composite materials. The air manifold 16 may be formed by injection molding, casting, machining, and the like.

In an exemplary embodiment, the air manifold 16 may be formed from relatively lightweight plastic material, e.g., such that the air manifold 16 weighs not more than about 0.25-4.0 pounds. Alternatively, all or one or more portions of the air manifold 16 may be formed from resilient semi-rigid or flexible material, e.g., to increase the durability and/or shock resistance of the apparatus 10.

In the embodiment shown, the air manifold 16 includes a manifold base 58 including a plurality of channels therein that at least partially define the passages 62-68, and a manifold cap 60 that mates with the manifold base 58 to substantially enclose the channels to further define the passages 62-68. It will be appreciated that the air manifold 16 may be formed from one or more components, instead of the manifold base 58 and the manifold cap 60, that mate together or otherwise cooperate to define the passages 62-68 described herein.

Figure 6:
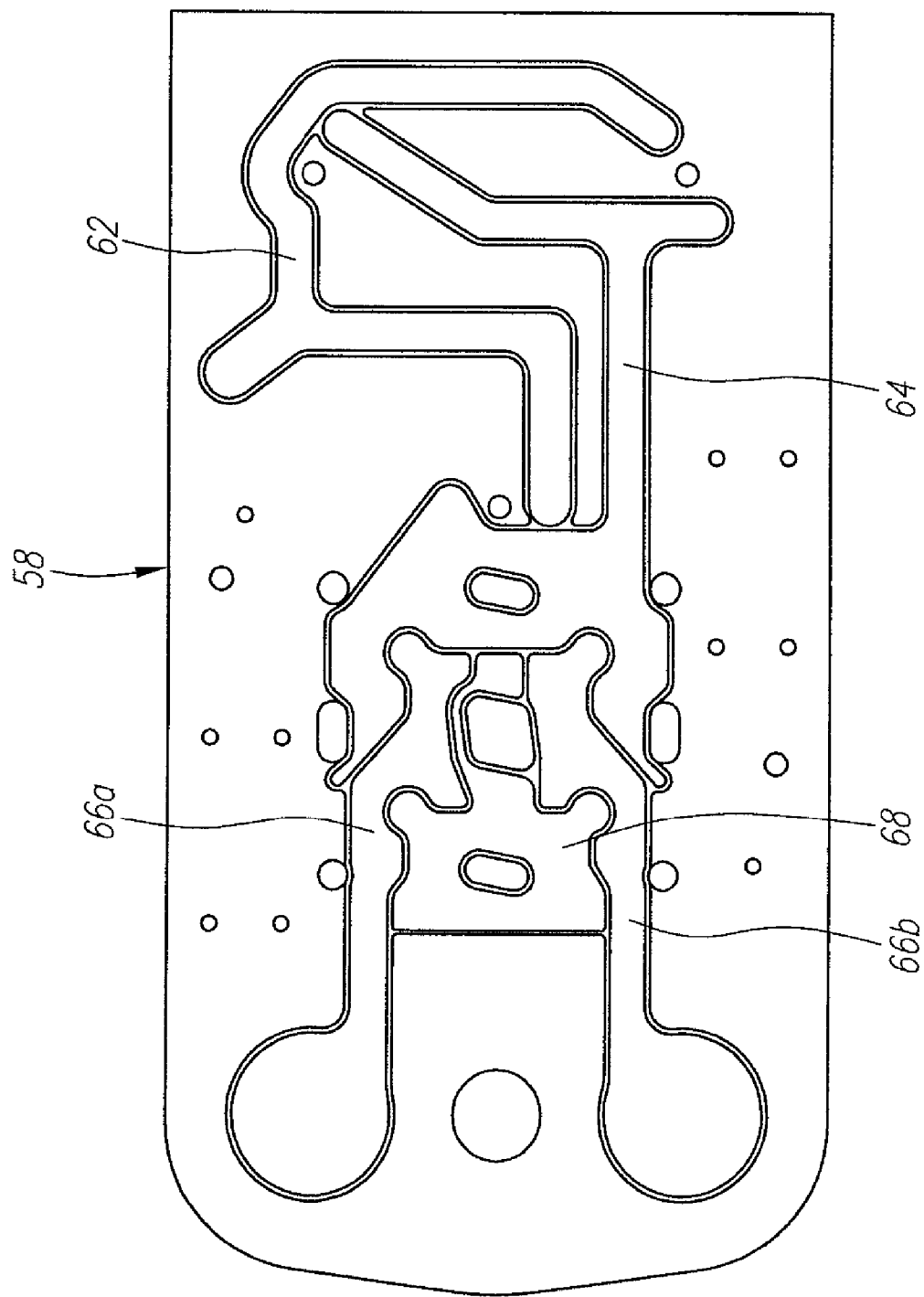
FIG. 6 is a top view of a manifold base that may be part of an air manifold of the apparatus of FIGS. 1A and 1B.

As best seen in FIG. 6, the manifold base 58 may include channels that at least partially define one or more compressor inlet passages 62, compressor outlet passages 64, sieve bed passages 66, and exhaust passages 68. Portions of the manifold base 58 unnecessary to define the passages 62-68 and/or mounting surfaces may be omitted, e.g., to reduce the overall weight of air the manifold 16 without substantially impacting its structural integrity. Alternatively, the manifold base 58 may have a substantially continuous lower wall, e.g., which may be substantially smooth and/or may include legs or other components (not shown) upon which the apparatus 10 may be set.

Figure 2:
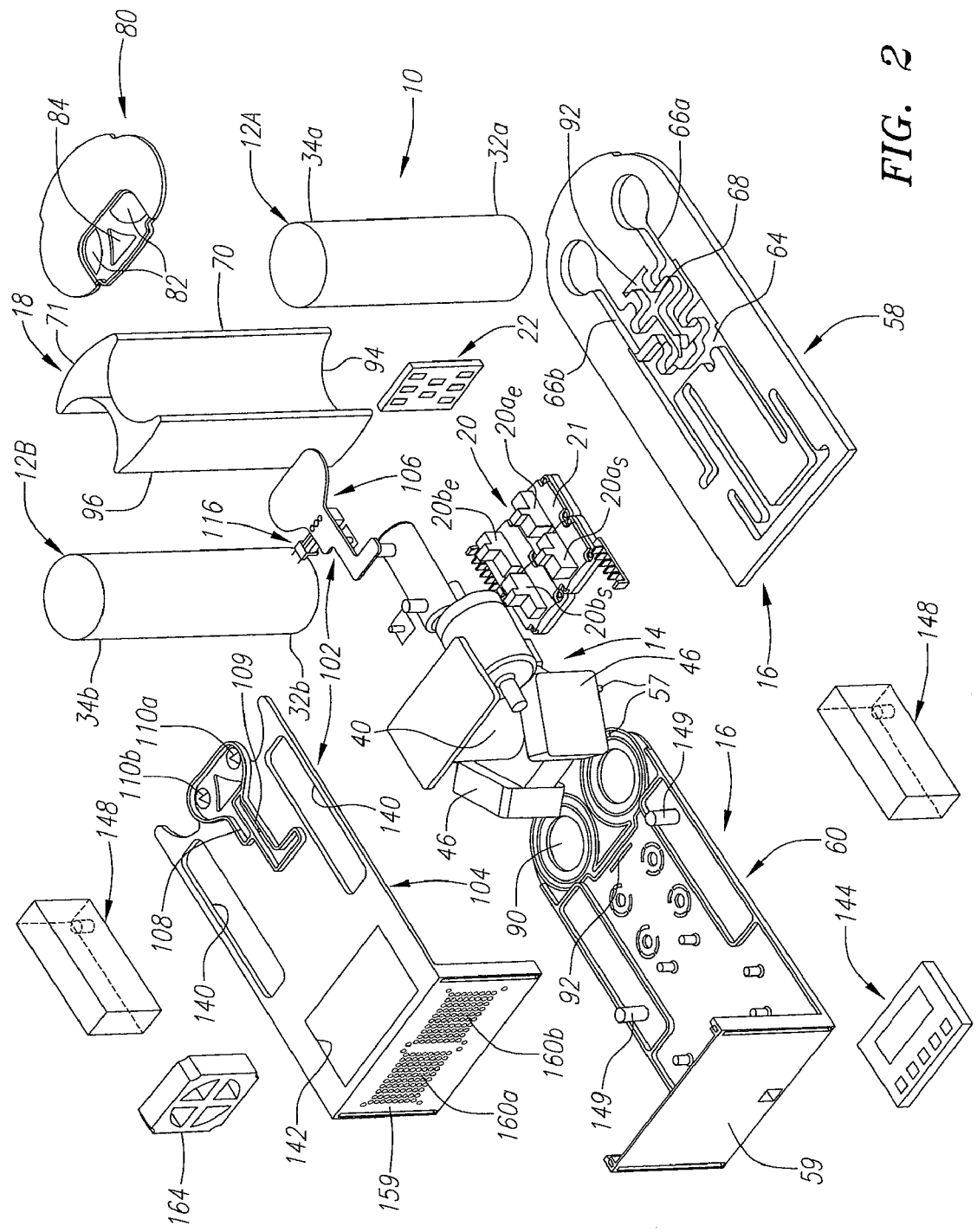
FIG. 2 is an exploded perspective view of the apparatus of FIGS. 1A and 1B.

In addition or alternatively, the manifold base 58 may include at least a portion of a side wall 59, e.g., which may define another outer structural surface of the apparatus 10. In a further alternative, as shown in FIG. 2, the side wall 59 may be part of the manifold cap 60, rather than the manifold base 58. In yet another alternative, the air manifold 16 may be relatively flat (rather than "L" shaped), and the side wall may be a separate component (not shown) that may be connected or otherwise attached to the air manifold 16.

Figure 7A:
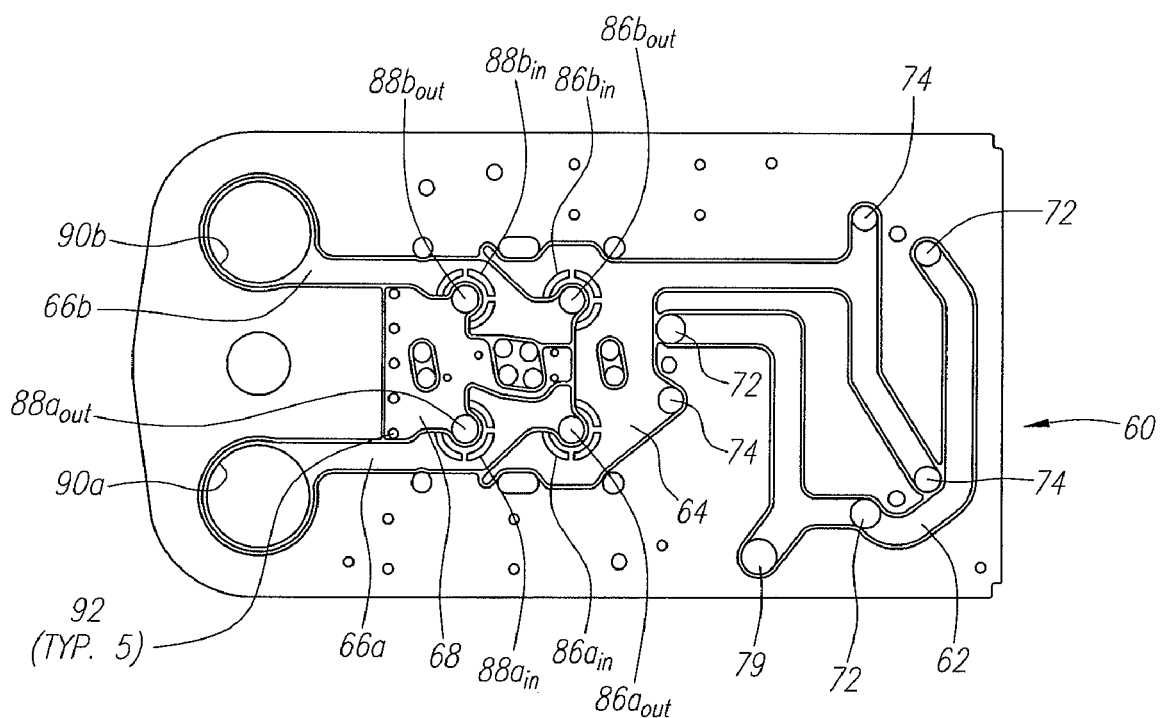
FIGS. 7A and 7B are bottom and top views, respectively, of a manifold cap that may be attached to the manifold base of FIG. 6.
Figure 7B:
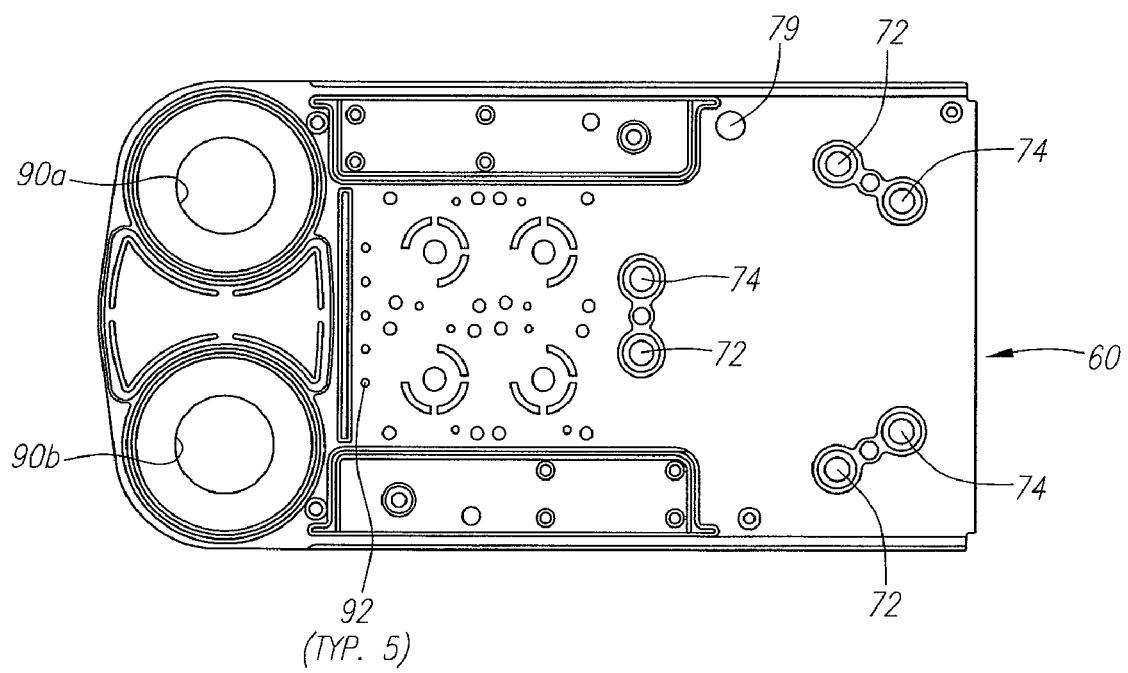

Turning to FIGS. 7A and 7B, the manifold cap 60 may include one or more channels that mate with the channels in the manifold base 58 to further define the passages 62-68, e.g., the compressor inlet passages 62, compressor outlet passages 64, sieve bed passages 66, and exhaust passages 68. Alternatively, the channels in the manifold cap 60 may be slightly larger or smaller than the channels in the manifold base 58 such that the channel walls overlap, which may enhance the connection between the manifold cap 60 and the manifold base 58. In another alternative, the manifold cap 60 may have a substantially smooth lower surface that mates against the channel walls and/or other components of the manifold base 58 to further define the passages 62-68.

The manifold cap 60 may be attached to the manifold base 58 using one or more connectors, e.g., cooperating detents, such as tabs and corresponding grooves, or fasteners, such as screws, rivets, bolts, and the like. In addition or alternatively, the manifold cap 60 may be attached to the manifold base 58 using adhesives, sonic welding, and the like, e.g., along one or more contact surfaces between the manifold base 58 and the manifold cap 60.

Figure 3:
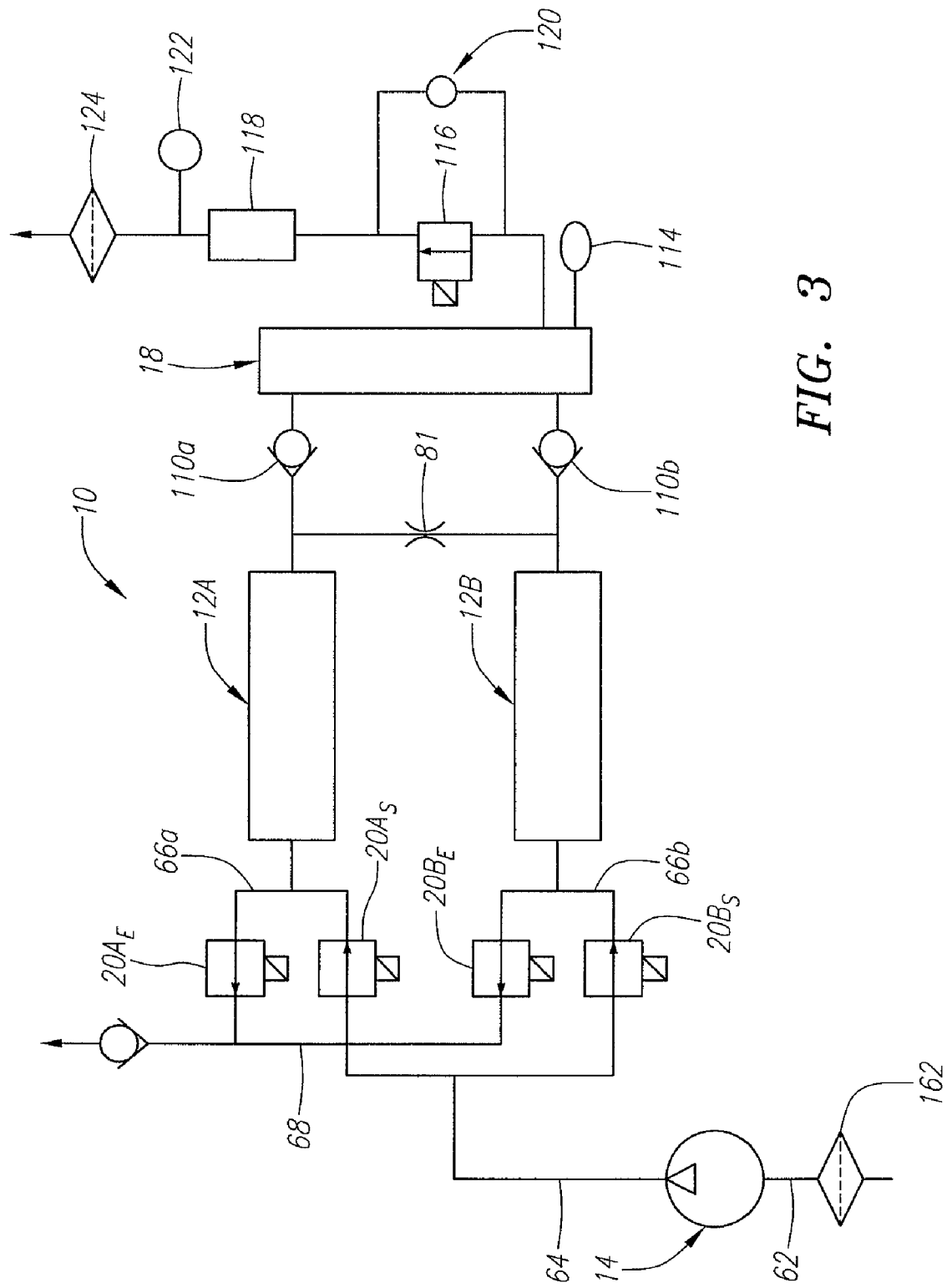
FIG. 3 is a schematic of the apparatus of FIGS. 1A and 1B.

With continued reference to FIGS. 7A and 7B, the manifold cap 60 may include a plurality of openings 72-79, 86-90 that communicate with the passages 62-68. For example, the manifold cap 60 may include an air inlet port 79 that communicates with the compressor inlet passage 62. The inlet port 79 may be coupled to a tube or other hollow structure (not shown) extending to an inlet opening 160 (not shown, see FIG. 2) in an outer surface of the apparatus 10, e.g., to allow ambient air to be drawn into the apparatus 10. Optionally, as shown in FIG. 3, an inlet air filter 162 may be provided in line before the inlet port 79 to remove dust or other particles from the ambient air drawn into the inlet opening 160 before it enters the compressor 14.

In addition, returning to FIGS. 7A and 7B, the manifold cap 60 may include multiple pairs of openings 72, 74 for communicating with the compressor 14. In the embodiment shown, the manifold cap 60 includes three pairs of openings 72, 74 corresponding to ports 57 (not shown, see FIG. 2) on the three diaphragm assemblies 46 of the compressor 14. Each pair of openings 72, 74 may be spaced apart a predetermined distance similar to the spacing of the ports 57 on the diaphragm assemblies 46. One or both of the openings 72, 74 and the ports 57 may include nipples or other extensions to facilitate a substantially airtight connection between the diaphragm assemblies 46 and the manifold cap 60. The ports 57 may be connected to the openings 72, 74, e.g., by one or more of interference fit, mating threads, cooperating detents, adhesives, and the like.

When the compressor 14 is mounted to or adjacent the air manifold 16, the inlet passages $56_{in}$ of the diaphragm assemblies 46 may communicate with the openings 72, and consequently with the compressor inlet passage 62. During use, when each of the diaphragm assemblies 46, in turn, draws in outside air via the inlet passages $56_{in}$, air may be drawn through the respective openings 72, the compressor inlet passage 62, and the inlet port 79. Similarly, the outlet passages $56_{out}$ of the diaphragm assemblies 46 may communicate with the openings 74, and consequently with the compressor outlet passage 64. During use, when each of the diaphragm assemblies 46 delivers compressed air out the outlet passages $56_{out}$, the compressed air may enter the respective openings 74 into the compressor outlet passages 64 in the air manifold 16.

With continued reference to FIGS. 7A and 7B, the manifold cap 60 may also include a plurality of air control valve openings 86, 88 adjacent one another that overly the compressor outlet passage 64, the sieve bed passages 66, and/or the exhaust passage 68. Thus, when the manifold cap 60 is attached to the manifold base 58, the air control valve openings 86, 88 may communicate with respective passages 64-68. In particular, supply valve inlet openings $86_{in}$ may communicate with the compressor outlet passage 64, while exhaust valve inlet openings $88_{in}$ communicate with respective sieve bed passages 68. Supply valve outlet openings $86_{out}$ may communicate with respective sieve bed passages 66, while exhaust valve outlet openings $88_{out}$ communicate with the exhaust passage 68.

The manifold cap 60 may also include sieve bed openings 90 that communicate with enlarged portions of the sieve bed passages 66. Thus, the sieve bed openings 90 may communicate with the first ends 32 of respective sieve beds 12 when the sieve beds 12 are mounted to or adjacent the air manifold 16. Further, as best seen in FIG. 7B, the manifold cap 60 may also include one or more exhaust openings 92 that communicates with the exhaust passage 68.

Optionally, a tube, nozzle, or other device (not shown) may be coupled to the exhaust opening(s) 92 to direct exhaust air (generally concentrated nitrogen) from the sieve beds 12, as explained further below. In one embodiment, the exhaust air may be directed towards the controller 22 or other electronics within the apparatus 10, e.g., for cooling the electronics. Using concentrated nitrogen as a cooling fluid for the internal electronics may provide a safety feature for the apparatus 10, namely reducing the risk of fire if the electronics ever overheat or short. Since most of the oxygen has been removed from the exhaust air, there is little or no fuel in the exhaust air to support a fire. Further, with the exhaust air being directed into the interior of the apparatus 10, if the reservoir 18 or sieve beds 12 were ever to develop a leak communicating with the interior of the apparatus 10, the resulting gas mixture would have no more oxygen (as a percentage of volume) than ambient air.

As described further below, the air control valves 20 may be mounted to the manifold cap 60 over the valve openings 86, 88 and the air control valves 20 may be selectively opened and closed to provide flow paths, e.g., from the compressor outlet passage 64 to the sieve bed passages 66 and/or from the sieve bed passages 66 to the exhaust passage 68. For example, with additional reference to FIG. 3, when supply air control valve $20a_S$ is open, a flow path may defined from the compressor 14 through openings 72, compressor passage 62, supply inlet openings $86_{in}$, the air control valve $20a_S$, supply outlet opening $86_{out}$, and the sieve bed passage 66a, into the sieve bed 12a. When exhaust air control valve $20b_E$ is open, a flow path may be defined from the sieve bed 12b, through the sieve bed passage 66b, exhaust inlet openings $88_{in}$, the air control valve $20b_E$, exhaust outlet openings $88_{out}$, exhaust passage 68, and out exhaust opening(s) 92.

The air manifold 16 may replace a plurality of tubes and valves that would otherwise be necessary to deliver air to and from the sieve beds 12. Because these individual tubes and valves are eliminated and replaced with a simple manifold including not more than four air control valves 20, the air manifold 16 may reduce the overall size, weight, and/or cost of the apparatus 10, which may be useful, particularly in order to make the apparatus 10 convenient, easy to use, and/or inexpensive.

Figure 10:
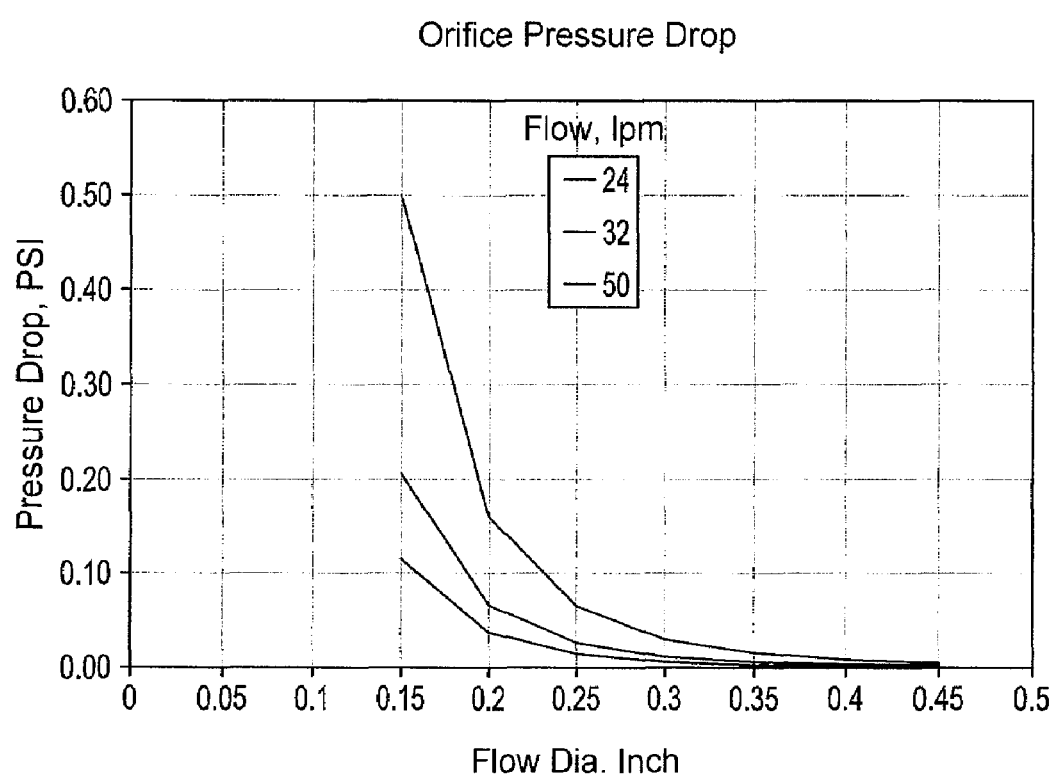
FIG. 10 is a graph, showing pressure drop of air flowing through a passage as a size of the passage increases based upon exemplary average flow rates.

In addition, the air manifold 16 may facilitate modifications, e.g., to reduce pressure losses and/or dampen noise. For example, to minimize energy needs for the apparatus 10, the size and/or shape of the passages 62-68 may be designed to reduce losses as compressed air pass through the passages 62-68. It has been found that if the pressure loss increases by one pound per square inch (1 psi), it may increase power consumption of the apparatus 10 by as much as ten percent (10%) or more. FIG. 10 shows pressure losses that may be encountered during three exemplary average flow rates, i.e., twenty four (24), thirty (30) and fifty (50) liters per minute (lpm). As the average flow diameter of the passages 62-68 is increased, the pressure drop is reduced significantly. Thus, it may be desirable for the passages 62-68 to have a size of at least about 0.25 inch diameter or other equivalent cross-section.

In addition, the air manifold 16 may facilitate providing baffles or other sound dampening devices or materials within the flow paths of the air moving through the apparatus 10. For example, one or more baffles, venturis, flow modifiers, and the like (not shown) may be molded directly into the channels of the manifold base 58 to absorb sound waves or reduce noise generated by airflow. Alternatively, such components may be inserted or mounted within the channels before the manifold cap 60 is attached to the manifold base 58. In yet another alternative, the air manifold 16 may allow flow control valves to be mounted directly in one or more of the passages 62-68.

Returning to FIGS. 1A-3, the air control valves 20 may be mounted or otherwise attached to the air manifold 16, e.g., to the manifold cap 60. In the embodiment shown, four "two way" air control valves 20 may be provided that may be mounted to the manifold cap 60, e.g., using one or more connectors, fasteners, adhesives, and the like. As explained further below, four air control valves 20 allow each sieve bed 12 to be pressurized and/or exhausted independently of the other, optionally with the ability to overlap the pressurization cycles.

An exemplary two-way valve that may be used for each of valves 20 is the SMC DXT valve, available from SMC Corporation of America, of Indianapolis, Ind. This valve is a relatively small plastic pilot operated diaphragm valve. Because of the large diaphragm area, it has a very low minimum operating pressure, which may be particularly useful given the operating pressures of the apparatus 10 during use. The valve may be provided as "normally open." When pressure is applied to the top side of the diaphragm through the pilot valve, the diaphragm may be forced down onto a seat, shutting off the flow. Either a normally open or normally closed pilot solenoid valve may be used. Since the diaphragm valve itself is normally open, using a normally open solenoid valve may create normally closed overall operation, requiring application of electrical energy to open the valve.

Alternatively, the air control valves 20 may be replaced with two "three-way" valves, which may require some minor changes to the openings and/or passages in the air manifold 16. Such valves, however, may be more expensive, complicated to operate, and/or may require greater pressure to pilot than the pressures encountered during use of the apparatus 10. In further alternatives, one or more other multiple position valves may be provided, instead of the four two way valves.

Returning to FIG. 3, the four air control valves 20 may be provided on a single valve manifold 21, e.g., an aluminum manifold, and the ports may be threaded inlet and outlet ports provided separately or as part of the valve manifold 21. After assembling the air control valves 20 to the valve manifold 21, the valve manifold 21 may be mounted to the air manifold 16 over the openings 86, 88. Alternatively, the individual air control valves 20 may be mounted directly to the air manifold 16, e.g., to avoid the valve manifold 21 or any other fittings and/or tubing, which may further reduce the overall size and/or weight of the apparatus 10.

Figure 8A:
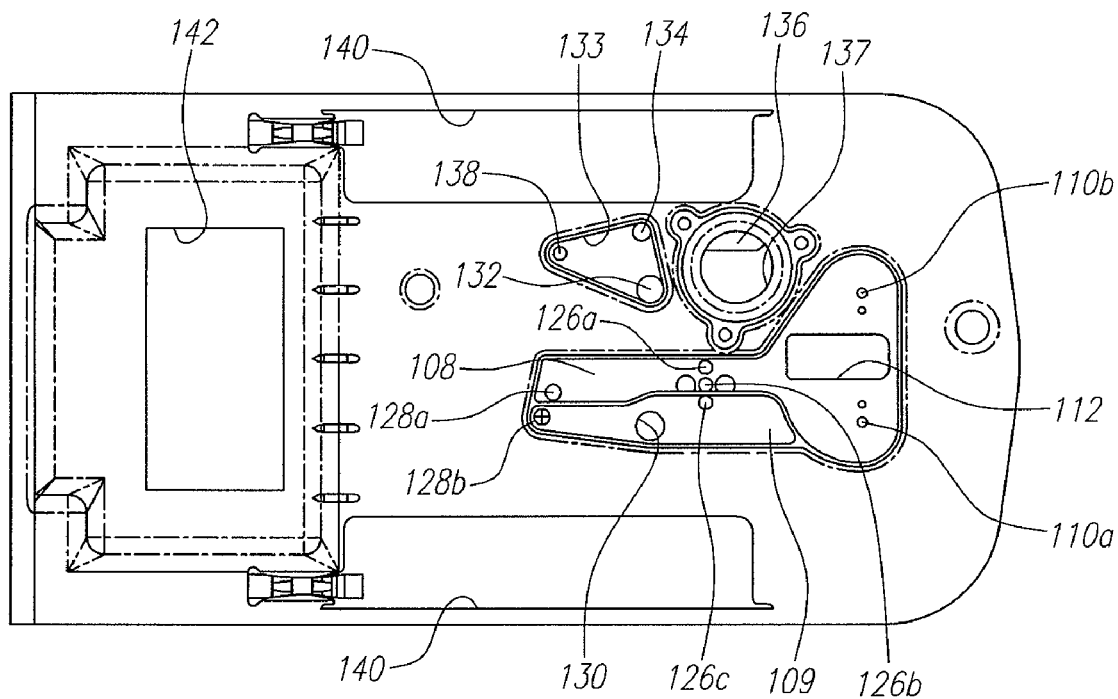
FIGS. 8A and 8B are perspective views of upper and lower sides a manifold base that may be part of an oxygen delivery manifold of the apparatus of FIGS. 1A and 1B.
Figure 8B:
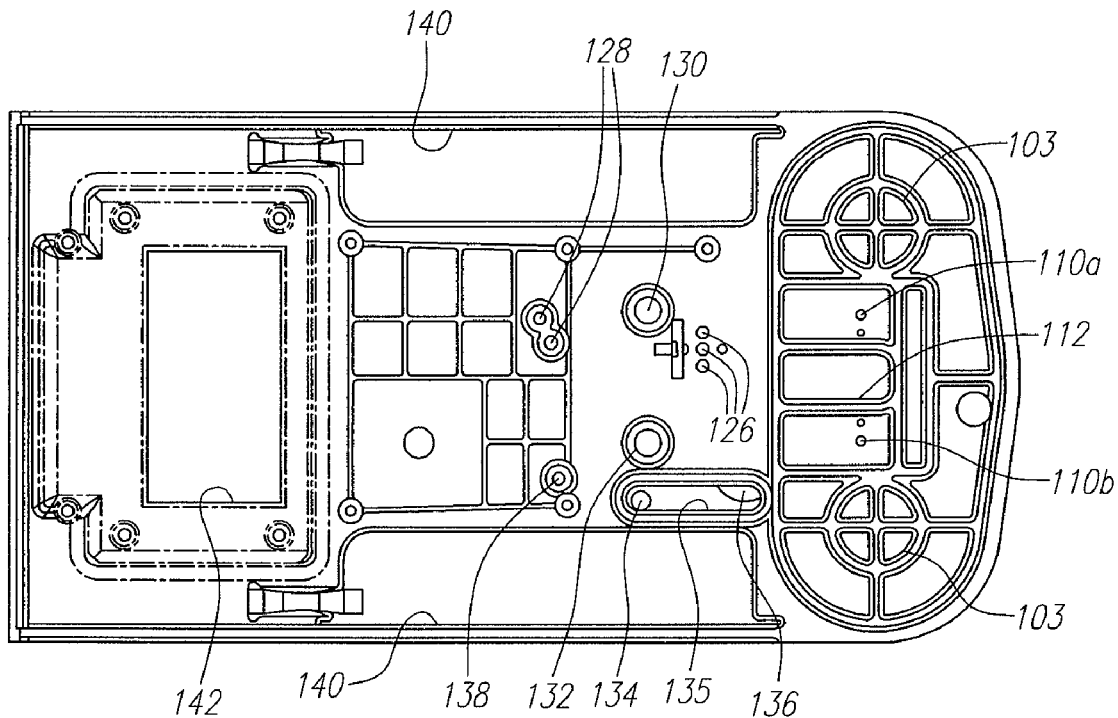

Returning to FIGS. 1A, 1B, and 2, with additional reference to FIGS. 8A-8B, the upper or oxygen delivery manifold 102 may be provided for delivering oxygen stored in the reservoir 18 to a user of the apparatus 10. Similar to the air manifold 16, the oxygen delivery manifold 102 may provide sufficient structural integrity to provide an outer structural surface of the apparatus 10, e.g., thereby eliminating the need for a separate outer or upper skin for the apparatus 10. The oxygen delivery manifold 102 may be manufactured and assembled using similar materials and/or methods to the air manifold 16, described above.

Optionally, as shown in FIG. 8B, the oxygen delivery manifold 102 may include one or more ribs or other reinforcing structures 103, e.g., on a lower surface of the oxygen delivery manifold 102. The reinforcing structures 103, may be molded or otherwise formed directly in the oxygen delivery manifold 102 in a desired pattern or attached to the oxygen delivery manifold 102, e.g., overlying the sieve beds 12 (not shown in FIG. 8B). Such reinforcing structures 103 may reinforce the oxygen delivery manifold 102, e.g., from the biasing mechanism 39 within the sieve beds 12 and/or against the pressure of the air within the sieve beds 12, which may apply an upward force against the oxygen supply manifold 102.

In the embodiment shown in FIG. 2, the oxygen delivery manifold 102 includes a manifold base 104 at least partially defining one or more oxygen delivery passages 108, 109 and a manifold cap 106 further defining the oxygen delivery passages 108, 109. The oxygen delivery passages 108, 109 may be disposed adjacent one another in the manifold base 104 and include a plurality of openings 126-138 for communicating with other components related to delivering oxygen to a user of the apparatus 10, as explained further below. The manifold base 104 may also include one or more battery openings 140 and/or an interface window 142, which may be molded or otherwise formed therein.

Optionally, as shown in FIG. 2, the manifold base 104 of the oxygen delivery manifold 102 may include at least a portion of a side panel 159 of the apparatus 10. The side panel 159 may abut, interlock, or otherwise mate with the side panel 59 on the air manifold 16. The side panels 59, 159 may provide an outer structural wall for the apparatus 10 that is substantially rigid. Thus, the side panels 59, 159 the manifolds 16, 102, and the sieve beds 12 and/or reservoir 18 combined may provide the necessary structural frame to support the apparatus 10 and its internal components, as explained further below. Alternatively, one or both side panels 59, 159 may be provided as a separate panel (not shown) that may be connected or otherwise attached to the air manifold 16 and/or the oxygen delivery manifold 102.

Returning to FIG. 2, the side panel 159 may include one or more inlet openings 160 that may communicate with an interior of the apparatus 10. As shown, the side panel 159 includes two inlet openings or screens 160 adjacent one another. The inlet openings 160 may be provided in a desired array, e.g., in a rectangular, square, round, or other configuration. In an exemplary embodiment, each of the inlet openings 160 may have a height and/or width of between about one and two inches (25-50 mm). The inlet openings 160 may include relatively small holes, e.g., between about 0.025-0.15 inch (0.6-4 mm) diameter, allowing air to pass easily through the inlet openings 160, yet preventing large objects from passing therethrough.

For example, the first inlet opening 160a may be provide an inlet for drawing air into the compressor 14, e.g., via tubing and the like (not shown) communicating with the air inlet port 79 of the air manifold 16, as described above. The second inlet opening 160b may provide a ventilation inlet for ambient air to be drawn into the interior of the apparatus 10, e.g., to assist cooling the internal electronics and/or the sieve beds 12. An intake fan 164 may be mounted adjacent the second inlet opening 160b, e.g., to draw ambient air into the interior of the apparatus 10 at a constant or variable speed and/or volume.

Optionally, the apparatus 10 may include one or more gaps, e.g., vertical spaces between the sieve beds 12 and/or reservoir 18 (not shown), to allow air to escape from the interior of the apparatus 10. For example, it may be desirable to have air within the interior of the apparatus 10 (particularly, the exhaust gas from the exhaust opening(s) 92) escape the apparatus 10 on the opposite end from the inlet openings 160 to avoid drawing nitrogen-rich air back into the sieve beds 12, which would reduce the efficiency, and possibly effectiveness, of the apparatus 10. Alternatively, one or more outlet openings (not shown) may be provided on the apparatus 10, e.g., in the air manifold 16, the oxygen delivery manifold 102, and/or one or more side panels (not shown) to allow air to escape from within the interior of the apparatus 10 in a desired manner.

Returning to FIG. 2, the apparatus 10 may include one or more components related to delivering oxygen from the reservoir 18 to a user. These components may be attached or otherwise mounted to or adjacent the oxygen delivery manifold 102, e.g., using methods similar to the methods for attaching other components of the apparatus 10 described herein.

For example, a pair of check valves 110 may be provided in the manifold base 104 that overly openings 82 in the cap 80. The check valves 110 may simply be pressure-activated valves, similar to the check valves 54 described above. When the oxygen delivery manifold 102 is mounted to or adjacent the sieve beds 12 and the reservoir 18, the check valves 110 provide one-way flow paths from the sieve beds 12 into the oxygen delivery passage 108. The oxygen delivery passage 108 communicates directly and continuously with the reservoir 18 via opening 112.

A pressure sensor 114 may be provided within the reservoir 18 or communicating with the oxygen delivery passage 108. The pressure sensor 114 may detect absolute pressure within the reservoir 18, and, consequently, within the oxygen delivery passage 108. In addition, because of the check valves 110, the pressure sensor 114 may provide a reading of the maximum pressure within the sieve beds 12. Specifically, because the check valves 110 allow one-way flow of oxygen from the sieve beds 12 into the reservoir 18 and oxygen delivery passage 108, whenever the pressure in either sieve bed 12 exceeds the pressure in the reservoir 18, the respective check valve 110 may open. Once the pressure within either sieve bed 12 becomes equal to or less than the pressure in the reservoir 18, the respective check valve 110 may close.

In addition, as shown in FIGS. 2 and 3, an oxygen delivery valve 116, oxygen sensor 118, one or more pressure sensors 120, 122, and one or more air filters 124 may be provided in line with the oxygen delivery passages 108, 109, e.g., mounted to the oxygen delivery manifold 102. For example, with additional reference to FIGS. 8A and 8B, the manifold base 104 may include oxygen control valve openings 126, pressure sensor openings 128, 138, oxygen sensor openings 130, 132, and outlet openings 134, 136 for communicating with these components. The oxygen delivery valve 116 may be mounted to the oxygen delivery manifold 102, e.g., below the oxygen control valve openings 126, for controlling the flow of oxygen between the oxygen delivery passages 108 and 109, and consequently from the reservoir 18 out of the apparatus 10 to a user. The oxygen delivery valve 116 may be a solenoid valve coupled to the controller 22 that may be selectively opened and closed. An exemplary valve that may be used for the oxygen delivery valve 116 is the Hargraves Technology Model 45M, which may have a relatively large orifice size, thereby maximizing the possible flow through the oxygen delivery valve 116. Alternatively, it may also be possible to use a Parker Pneutronics V Squared or Series 11 valve.

When the oxygen delivery valve 116 is open, oxygen may flow from oxygen delivery passage 108, through the oxygen control valve openings 126a, 126b, the oxygen delivery valve 116, the oxygen control valve opening 126c, and into oxygen delivery passage 109. The oxygen delivery valve 116 may be opened for desired durations at desired frequencies, which may be varied by the controller 22, thereby providing pulse delivery as explained further below. Alternatively, the controller 22 may maintain the oxygen delivery valve 116 open to provide continuous delivery, rather than pulsed delivery. In this alternative, the controller 22 may throttle the oxygen delivery valve 116 to adjust the volumetric flow rate to the user.

The pressure sensor 120 may also be mounted to and/or below the oxygen delivery manifold 102 such that ports of the pressure sensor 120 are coupled to or otherwise communicate with the pressure sensor openings 128. Thus, the ports of the pressure sensor 120 may measure a pressure difference between oxygen delivery passages 108, 109, and consequently across the oxygen delivery valve 116. Optionally, the pressure sensor 120 may be used to obtain reservoir pressure, and pressure sensor 114 may be eliminated. For example, when the oxygen delivery valve 116 is closed, pressure upstream of the oxygen delivery valve 116 may correspond substantially to the pressure within the reservoir 18.

The pressure sensor 120 may be coupled to the controller 22, e.g., to provide signals that may be processed by the controller 22 to determine the pressure differential across the oxygen delivery valve 116. The controller 22 may use this pressure differential to determine a flow rate of the oxygen being delivered from the apparatus 10 or other parameters of oxygen being delivered. The controller 22 may change the frequency and/or duration that the oxygen delivery valve 116 is open based upon the resulting flow rates, e.g., based upon one or more feedback parameters, as described further below.

The oxygen sensor 118 may also be mounted to and/or below the oxygen delivery manifold 102 such that ports on the oxygen sensor 118 communicate with the oxygen sensor openings 130, 132. The oxygen sensor 118 may be capable of measuring the purity of oxygen passing therethrough, e.g., an ultrasonic sensor that measures the speed of sound of the gas passing through the oxygen sensor 118, such as those made by Douglas Scientific of Shawnee, Kans. Alternatively, the oxygen sensor 118 may be a ceramic or sidestream sensor. Ultrasonic sensors may use less power than ceramic sensors, e.g., about fifty milliwatts (50 mW) versus one watt (1 W)), but may be more expensive.

The oxygen sensor 118 may be coupled to the controller 22 and may generate electrical signals proportional to the purity that may be processed by the controller 22 and used to change operation of the apparatus 10, as described further below. Because the accuracy of the oxygen sensor 118 may be affected by airflow therethrough, it may be desirable to sample the purity signals during no flow conditions, e.g., when the oxygen delivery valve 116 is closed.

The pressure sensor 122 may be mounted to and/or or below the oxygen manifold 102 such that the port of the pressure sensor 122 communicates with pressure sensor opening 138. The pressure sensor 122 may be a piezo resistive pressure sensor capable of measuring absolute pressure. Exemplary transducers that may be used include the Honeywell Microswitch 24PC01SMT Transducer, the Sensym SX01, Motorola MOX, or others made by All Sensors. Because the pressure sensor 122 may be exposed to the full system pressure of the apparatus 10, it may be desirable for the over-pressure rating of the pressure sensor 122 to exceed the full system pressure, e.g., to be at least about fifteen pounds per square inch (15 psi).

The pressure sensor 122 may be coupled to the controller 22 for providing signals proportional to the pressure detected by the pressure sensor 122, as explained further below. Because the pressure sensor 122 may not have a zero reference, the pressure signals from the pressure sensor 122 may drift during operation of the apparatus 10. To minimize any drift or other error introduced by the pressure sensor 122, a small valve (not shown) may be coupled to the pressure sensor 122 to periodically vent or zero the pressure sensor 122, e.g., when the oxygen delivery valve 116 is open and delivering oxygen.

Alternatively, a relative small orifice (e.g., about 0.010 inch diameter) may be provided in the line between the oxygen delivery valve 116 (e.g., the normally open port), and the pressure sensor 122. This orifice may be small enough not to adversely affect the pressure signals from the pressure sensor 122, but large enough so that the pressure sensor 122 is bled to zero, e.g., during a pulse as short as one hundred milliseconds (100 ms.). Additional information on using such an orifice may be found in published application No. 2003/0150455, the entire disclosure of which is expressly incorporated by reference herein. In another alternative, the controller 22 may implement a filtering algorithm to recognize the beginning of the user's breath.

The manifold base 104 may include a recess 133 that communicates with oxygen sensor opening 132 and pressure sensor opening 138. A cover or other member (not shown) may be attached over or otherwise cover the recess 133, e.g., to provide a substantially airtight passage defined by the recess 133. Thus, the pressure sensor 122 may measure an absolute pressure of the oxygen within the recess 133. This pressure reading may be used to detect when a user is beginning to inhale, e.g., based upon a resulting pressure drop within the recess 133, which may trigger delivering a pulse of oxygen to the user, as explained further below.

The air filter 124 may be mounted to or adjacent the oxygen delivery manifold 102, and may include any conventional filter media for removing undesired particles from oxygen being delivered to the user. As best seen in FIG. 8A, the oxygen delivery manifold 102 may include a recess 137 shaped to receive the air filter 124 therein. The air filter 124 may be secured within the recess 137 by an interference fit, by one or more connectors, adhesives, and the like.

The recess 137 (shown in FIG. 8A) may communicate with the channel 135 (shown in FIG. 8B) via outlet opening 136. In the embodiment shown, the channel 135 extends between the outlet openings 134, 136 formed in and through the manifold base 104. A cover or other member (not shown) may be attached or otherwise cover the channel 135, e.g., to provide a substantially airtight passage defined by the channel 135. Thus, oxygen delivered from the oxygen sensor 118 may leave the recess 133 through outlet opening 134, pass along channel 135, and enter recess 137 through outlet opening 136. The oxygen may then pass through the air filter 124 and be delivered to the user.

Optionally, a dome or other device (not shown) may be mounted to the oxygen delivery manifold 102 over the recess 137. The dome may be attached to the oxygen delivery manifold 102, e.g., by mating threads, one or more detents or other connectors, adhesives, and the like (also not shown). The dome may include a nipple or other connector to which a cannula, e.g., flexible hose, and the like (also not shown), may be attached for delivering the oxygen to a user, as is known in the art. The dome may be separate from the air filter 124 or the dome and air filter 124 may be a single assembly that may be attached together to the oxygen delivery manifold 102 over the recess 137.

It will be appreciated that other configurations and/or components may be provided for delivering oxygen to the user, rather than the oxygen delivery manifold 102 and the components attached thereto described above. In addition, although the components, e.g., oxygen delivery valve 116, pressure sensors 120, 122, oxygen sensor 118, and air filter 124 are described in a particular sequence (relative to oxygen flowing through the oxygen delivery manifold 102), the sequence of these components may be changed, if desired.

Returning to FIG. 2, the controller 22 may include one or more hardware components and/or software modules that control one or more aspects of the operation of the apparatus 10. The controller 22 may be coupled to one or more components of the apparatus 10, e.g., the compressor 14, the air control valves 20, the oxygen delivery valve 116, the pressure sensors 114, 120, 122, and/or the oxygen sensor 118. The components may be coupled by one or more wires or other electrical leads (not shown for simplicity) capable of receiving and/or transmitting signals between the controller 22 and the components.

The controller 22 may also be coupled to a user interface 144, which may include one or more displays and/or input devices. In the embodiment shown in FIG. 2, the user interface 144 may be a touch-screen display that may be mounted within or below interface window 142 in the oxygen delivery manifold 102. The user interface 144 may display information regarding parameters related to the operation of the apparatus 10 and/or allow the user to change the parameters, e.g., turn the apparatus 10 on and off, change dose setting or desired flow rate, etc., as explained further below. Although a single user interface 144 is shown, it will be appreciated that the user interface may include multiple displays and/or input devices, e.g., on/off switches, dials, buttons, and the like (not shown). The user interface 144 may be coupled to the controller 22 by one or more wires and/or other electrical leads (not shown for simplicity), similar to the other components.

For simplicity, the controller 22 shown in FIG. 2 includes a single electrical circuit board that includes a plurality of electrical components thereon. These components may include one or more processors, memory, switches, fans, battery chargers, and the like (not shown) mounted to the circuit board. It will be appreciated that the controller 22 may be provided as multiple subcontrollers that control different aspects of the operation of the apparatus 10. For example, a first subcontroller may control operation of the motor 40 of the compressor 14 and the air control valves 20, and a second subcontroller may control operation of the oxygen delivery valve 116 and/or the user interface 144.

The controller 22, e.g., a first subcontroller that controls operation of the compressor 14, may include a brushless DC motor controller, such as one of the Motorola/ON MC33035 family, the Texas Instruments DSP TMS 320LF240, and/or the MSP 430 F4491PZ. Such a controller may use utilize hall sensors (not shown) in the motor 40 to time commutation. Alternatively, a sensor-less controller may be used that allows commutation timing via back-EMF measurement, i.e., the position of the armature of the motor may be determined by the measurement of the back EMF of the coils of the motor. This alternative may be less expensive, because the sensors in the motor may be eliminated, and the wiring to the motor may be simplified. For example, Fairchild may have a dedicated integrated circuit appropriate for use in the controller 22. Alternatively, a Texas Instruments DSP TMS 320LF240 or the MSP 430 F4491PZ microprocessor may be used that includes integrated sensor-less control peripherals.

The first subcontroller (or other component of the controller 22) may control a speed of the motor, and consequently, a pressure and/or flow rate of compressed air delivered by the diaphragm assemblies 46. The controller 22 may also control the sequence of opening and closing the air control valves 20, e.g., to charge and purge the sieve beds 12 in a desired manner, such as the exemplary methods described further below.

The second subcontroller (or other component of the controller 22) may control the oxygen delivery valve 116, e.g., to deliver oxygen from the reservoir 18 to a user based upon pressure signals received from the pressure sensor 122. The second subcontroller may also receive input instructions from the user and/or display information on the user interface 144. In addition, the subcontrollers or other components of the controller 22 may share information in a desired manner, as described below. Thus, the controller 22 may include one or more components, whose functionality may be interchanged with other components, and the controller 22 should not be limited to the specific examples described herein.

In addition, the apparatus 10 may include one or more power sources, coupled to the controller 22, compressor 14, the air control valves 20, and/or the oxygen delivery valve 116. For example, as shown in FIG. 2, a pair of batteries 148 may be provided that may be mounted or otherwise secured to the air manifold 16, e.g., along the open sides between the side walls 59, 159 and the sieve beds 12. The air manifold 16 may include one or more mounts 149 that may be received in the batteries 148, e.g., to stabilize and/or otherwise secure the batteries 148 vertically within the apparatus 10. In addition or alternatively, other straps or supports (not shown) may also be used to secure the batteries 148 within the apparatus 10.

In exemplary embodiments, the batteries 148 may be rechargeable batteries, such as eleven (11) volt nominal 3 series Li-Ion batteries, 4 series Li-Ion batteries (such as those available from Inspired Energy, e.g., Part No.

NL2024), and the like. For 3 series packs, standard one pound (1 lb) packs may have a current limitation of three (3) amperes, while one and a half pound (1.5 lb.) packs may have a maximum current of six (6) amperes. Additional information on Inspired Energy batteries that may be used may be found at www.inspired-energy.com. Other sources of batteries may include Molien Energy (www.molienergy.com), GP Batteries (www.gpbatteries.com), Micro-Power (www.micro-power.com), and Buchmann (www.buchmann.ca).

The controller 22 may control distribution of power from the batteries 148 to other components within the apparatus 10. For example, the controller 22 may draw power from one of the batteries 148 until its power is reduced to a predetermined level, whereupon the controller 22 may automatically switch to the other of the batteries 148.

Optionally, the apparatus 10 may include an adapter such that an external power source, e.g., a conventional AC power source, such as a wall outlet, or a portable AC or DC power source, such as an automotive lighter outlet, a solar panel device, and the like (not shown). Any transformers or other components (also not shown) necessary to convert such external electrical energy such that it may be used by the apparatus 10 may be provided within the apparatus 10, in the cables connecting the apparatus 10 to the external power source, or in the external device itself.

Optionally, the controller 22 may direct some electrical energy from external sources back to the batteries 148 to recharge them in a conventional manner. The controller 22 may also display the status of the electrical energy of the apparatus 10, e.g., automatically or upon being prompted via the user interface 144, such as the power level of the batteries 148, whether the apparatus 10 is connected to an external power source, and the like.

The controller 22 may include one or more dedicated components for performing one or more of these functions. An exemplary battery management integrated circuit (IC) that may be included in the controller 22 is the Maxim MAX1773 type, which is designed for dual battery systems (see, e.g., www.maxim-ic.com/quick_view2.cfm/qv_pk/2374 for more information). Another is the Linear LTC1760, which is also designed for dual battery systems and combines similar selector functions with charging (see, e.g., www.linear.com/prod/datasheet.html?datasheet=989 for more information).

Returning to FIGS. 1A-3, to assemble the apparatus 10, the components of the air and oxygen delivery manifolds 16, 102 may be manufactured and assembled, as described above. For example, the manifold bases 58, 104, manifold caps 60, 106 and/or other caps or covers (not shown) may be molded or otherwise manufactured, and the manifold caps 60, 106 and/or other caps or covers (not shown) may be attached to the manifold bases 58, 104, e.g., using one or more of cooperating detents, connectors, fasteners, interference fit, adhesives, and the like (not shown). Similarly, the sieve beds 12, reservoir 18, and compressor 20 may be manufactured and/or assembled, e.g., as described above.

The air control valves 16, sieve beds 12, reservoir 18, and/or compressor 20 may be mounted to the air manifold 16, e.g., to the manifold cap 60, also as described above. Similarly, the oxygen delivery valve 116, pressure sensors 120, 122, oxygen sensor 118, air filter 124, and/or other components may be mounted to oxygen delivery manifold 102. The oxygen delivery manifold 102 may be attached to the sieve beds 12 and reservoir 18, e.g., after or before the sieve beds 12 and reservoir 18 are attached to the air manifold 16. The order of assembly is not important and may be changed to facilitate desired manufacturing facilities and/or procedures.

Simultaneously or separately, the side walls 59, 159 may be attached to one another, or, if the side walls 59, 159 are one or more separate panels (not shown), they may be attached to and/or between the air manifold 16 and the oxygen delivery manifold 102. The resulting structure may provide a structural frame for the apparatus 10 that may eliminate the need for additional supports or structural or cosmetic outer skins.

The controller 22 may be mounted within the structural frame and any wires or other leads may be connected between the controller 22 and the other components coupled thereto. In an exemplary embodiment, the controller 22 (or at least one subcontroller) may be mounted to the air manifold 16, e.g., vertically adjacent the exhaust opening(s) 92. Thus, the gas exiting the air manifold 16, e.g., concentrated nitrogen, may be directed across or otherwise towards the controller 22 for cooling its components. Brackets or other supports (not shown) may be mounted to the manifold cap 60 and the circuit board(s) and/or other components of the controller 22 may be secured by the brackets or supports in a conventional manner.

The batteries 148 may be inserted into the apparatus 10 at any time, e.g., after access to the interior is no longer needed. The side regions between the manifolds 16, 102 may remain substantially open (other than any area covered by the batteries 148), e.g., to provide access during assembly and/or testing of the components of the apparatus 10. Optionally, a relatively thin and/or light-weight skin or other structure (not shown) may be provided in each of the open side regions to substantially enclose the interior of the apparatus 10, e.g., to limit access and/or protect the components therein.

To provide a water-tight and/or aesthetic finish for the apparatus 10, a case (not shown) may be provided into which the entire apparatus 10 may be placed. Conventional portable oxygen concentrator devices, despite having a structural outer skin, are often kept in a carrying case, e.g., constructed from canvas, fabric, plastic, or combinations of these or other materials. Unlike such devices, the apparatus 10 may be provided in a relatively soft bag or other case without additional rigid structural skins or panels, which may reduce the overall weight of the apparatus 10.

An exemplary embodiment of a case may include one or more closable openings, e.g., overlying the battery openings 142, the filter recess 137, and/or other locations on the apparatus 10. In addition, the case may include an opening or a substantially transparent window that may be provided over the user interface 144. Optionally, the case may include padding or other sound absorption and/or cushioning materials in one or more panels of the case.

Returning to FIG. 3, the basic operation of the apparatus 10 will now be described. Generally, operation of the apparatus 10 has two aspects, concentrating oxygen from ambient air by adsorption within the sieve beds 12, and delivering concentrated oxygen to a user from the reservoir 18, each of which is described below. Each aspect of the apparatus 10 may operate independently of the other, or they may be interrelated, e.g., based upon one or more related parameters.

The apparatus 10 may be operated using one or more optional methods, such as those described below, to increase efficiency or other performance characteristics of the apparatus 10. For example, based upon measurements of pressure and/or oxygen purity, the operating conditions of the apparatus 10 may be adjusted to increase oxygen purity and/or concentration, output flow rate and/or pressure, reduce power consumption, and the like.

In exemplary embodiments, the apparatus 10 may have the capability to deliver up to about 0.9 or 1.2 liters per minute (lpm) equivalent of pure oxygen. As used herein, equivalent flow rates may be used, which correspond substantially to the amount of pure (100%) oxygen gas delivered per unit of time. Because the apparatus 10 concentrates oxygen by adsorption from ambient air, the apparatus 10 does not generate pure oxygen for delivery to a user. Instead, the gas that escapes from the sieve beds 12 that is stored in the reservoir 18 may have a maximum concentration of oxygen of about ninety five percent (95.4%), with the rest of the gas being argon and other trace gases (about 4.6%).

At a given flow rate, the actual amount of concentrated oxygen delivered by the apparatus 10 may be less than for pure oxygen. Thus, concentrated oxygen may have less therapeutic value than pure oxygen. To compensate for this deficit and provide equivalent volumes of oxygen, the flow rate of concentrated oxygen must be higher than for pure oxygen. The ratio of delivered concentrated oxygen to equivalent pure oxygen is:

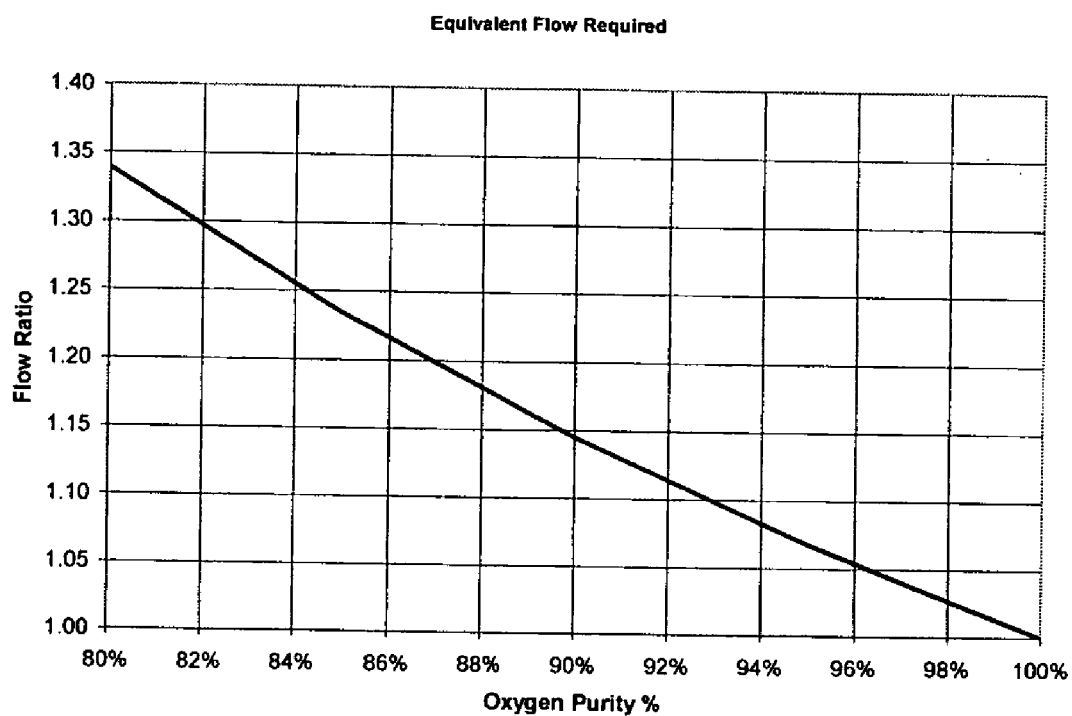

For example, 1.05 lpm of 88% concentrated oxygen may be substantially equivalent to 0.9 lpm of pure oxygen and 1.4 lpm of 88% concentrated oxygen may be substantially equivalent to 1.2 lpm of pure oxygen.

Testing has shown that compensating for purity by increasing the flow rate may reduce overall power consumption for the apparatus 10. When the competing values of oxygen purity and power consumption are balanced, oxygen purities between about 85-90% may result in desirable efficiencies, with 88% being an exemplary target oxygen purity for the gas delivered by the apparatus 10 to a user.

Generally, to generate concentrated oxygen (which may be stored in the reservoir 18 and/or delivered directly to the user), the apparatus 10 is operated such that the sieve beds 12 are alternatively "charged" and "purged." When a sieve bed 12 is being charged or pressurized, compressed ambient air is delivered from the compressor 14 into the air inlet/outlet end 32 of the sieve bed 12, causing the sieve material to adsorb more nitrogen than oxygen as the sieve bed 12 is pressurized. While the nitrogen is substantially adsorbed by the sieve material, oxygen escapes through the oxygen inlet/outlet end 34 of the sieve bed 12, where it may be stored in the reservoir 18 and/or be delivered to the user.

Once the pressure within the sieve bed 12 reaches a predetermined limit (or after a predetermined time), the sieve bed 12 may then be purged or exhausted, i.e., the air inlet/outlet end 32 may be exposed to ambient pressure. This causes the compressed nitrogen within the sieve bed 12 to escape through the air inlet/outlet end 32, e.g., to pass through the air manifold 16 and exit the exhaust opening(s) 92. Optionally, as the sieve bed 12 is being purged, oxygen escaping from the other sieve bed 12 (which may be being charged simultaneously) may pass through the purge orifice 81 into the oxygen inlet/outlet end 34 of the purging sieve bed 12, e.g., if the pressure within the charging sieve bed is greater than within the purging sieve bed, which may occur towards the end of purging. In addition or alternatively, oxygen may pass through the check valves 110 between the sieve beds, e.g., when the relative pressures of the sieve beds 12 and the reservoir 18 causes the check valves 110 to open, in addition to or instead of through the purge orifice 81. This oxygen delivery into the oxygen inlet/outlet end 34 of the sieve bed 12 being purged may assist evacuating the concentrated nitrogen out of the sieve bed 12 before it is charged again.

The size of the purge orifice 81 may be selected to allow a predetermined oxygen flow rate between the charging and purging sieve beds 12. It is generally desirable that the flow through the purge orifice 81 is equal in both directions, such that both sieve beds 12 may be equally purged, e.g., by providing a purge orifice 81 having a geometry that is substantially symmetrical. In an exemplary embodiment, the purge orifice 81 may have a diameter or other equivalent cross-sectional size of about 0.02 inch (0.5 mm) such that about 2.6 lpm may pass therethrough at about five pounds per square inch (5 psi) pressure difference across the purge orifice 81. This capacity of the purge orifice 81 may not correspond to the actual volume of oxygen that may flow between the sieve beds 12 during operation of the apparatus 10, since the actual flow may be based the pressure difference between the charging and purging sieve beds 12, which changes dynamically based upon the various states of the apparatus 10.

In an exemplary embodiment, shown in Table 2 below, the apparatus 10 may be operated using a process that includes four (4) states. "1" and "0" represent open and closed states of the air control valves 20, respectively.

TABLE 2

| State | Time | Description | Valve $20a_s$ | Valve $20a_e$ | Valve $20b_s$ | Valve $20b_e$ |
|---|---|---|---|---|---|---|
| 1 | Time Pressurize ~6 sec. | Pressurize 12a Exhaust 12b | 1 | 0 | 0 | 1 |
| 2 | Time Overlap ~0.2 sec | Pressurize both 12a and 12b | 1 | 0 | 1 | 0 |
| 3 | Time Pressurize ~6 sec. | Pressurize 12b Exhaust 12a | 0 | 1 | 1 | 0 |
| 4 | Time Overlap ~0.2 sec | Pressurize both 12a and 12b | 1 | 0 | 1 | 0 |

During State 1, sieve bed 12a is being charged and sieve bed 12b is being purged. As shown in the table, supply air control valve $20a_s$ and exhaust air control valve $20b_e$ are open, and supply air control valve $20b_s$ and exhaust air control valve $20a_e$ are closed. With additional reference to FIG. 6, with this valve arrangement, sieve bed 12a communicates with the compressor 14 via compressor outlet passage 64 and sieve passage 66a, while sieve bed 12b communicates with exhaust opening(s) 92 via sieve bed passage 66b and exhaust passage 68. At the end of state 1, as the pressure within sieve bed 12a exceeds the pressure within sieve bed 12b, the purge orifice 81 provides a low flow of oxygen gas to flush remaining nitrogen from sieve bed 12b. State 3 is the mirror image of State 1, i.e., sieve bed 12b is being charged and sieve bed 12a is being purged.

The duration of States 1 and 3 (Time Pressurize) may be set based upon one or more parameters, such as the size of the purge orifice 81, the purity of oxygen leaving the sieve beds 12, pressure within the reservoir 18, and the like, as described further elsewhere herein. For example, during State 1, if Time Pressurize is too long, all remaining nitrogen in sieve bed 12b (which is being purged) may be purged, and oxygen from sieve bed 12a (which is being charged) passing through the purge orifice 81 into sieve bed 12b may escape out the exhaust opening(s) 92, wasting oxygen. If Time Pressurize is too short, nitrogen may remain in sieve bed 12b at the end of the purge cycle, which may reduce the efficiency of the sieve bed 12b when it is subsequently charged. Thus, it may be desirable to hold the size of the purge orifice 81 to a very tight flow tolerance, and manufacture the sieve beds 12 under strict control, such that performance of the sieve beds 12 is consistent within allowable tolerances without having to adjust Time Pressurize during and/or after manufacturing.

During State 2, supply air control valve $20b_s$ is opened and exhaust air control valve $20a_e$ is closed. This allows pressurized air from sieve bed 12a to flow into sieve bed 12b through the purge orifice 81. Generally, State 2 is relatively short compared to States 1 and 3, e.g., such that pressurized air enters sieve bed 12b before concentrated nitrogen within sieve bed 12a begins to enter sieve bed 12b. State 2 may reduce the amount of compressed air that must be delivered from the compressor 14 before State 3, which may improve overall efficiency of the apparatus 10. Similarly, during State 4, supply air control valve $20a_s$ is opened and exhaust air control valve $20b_e$ is closed. Thus, during State 4, compressed air flows from sieve bed 12b to sieve bed 12a before sieve bed 12a is charged (when State 1 is repeated).

In the embodiment shown in Table 2 above, the durations (Time Overlap) of States 2 and 4 are substantially shorter than the durations (Time Pressurize) of States 1 and 3. For example, the durations (Time Overlap) of States 2 and 4 may be not more than about 1.5 seconds or not more than about 0.6 second, while the durations (Time Pressurize) of States 1 and 3 may be at least about four (4) seconds or at least about five (5) seconds.

Optionally, one or more of the durations may be varied, for example, as user demand (e.g., dose setting and/or breathing rate) and/or other parameters warrant the change(s). Alternatively, the durations (Time Pressurize and Time Overlap) may be fixed when the controller 22 is initially programmed and/or subsequently serviced. In either case, times or time constants may be saved in flash-type memory or other memory associated with the controller 22. If desired, the times or time constants may be adjusted, e.g., via a serial connection during initial manufacturing, in a subsequent service environment, and/or during use, and the new values may be stored within the memory.

For example, it may be desirable to reduce the durations of States 1 and 3 (Time Pressurize) as the pressure within the reservoir 18 ("reservoir pressure" or $P_{res}$) increases. As the reservoir pressure increases, the higher pressure may drive more gas through the purge orifice 81, reducing the amount of time required to substantially exhaust nitrogen from the sieve bed 12 being purged. An equation may be created to determine the optimum time (Time Pressurize) based upon the reservoir pressure. For example, the equation may be estimated based upon a linear relationship:

$$\text{Time Pressurize} = k * P_{res}.$$

where k is a constant that may be determined theoretically or empirically. Alternatively, a more complicated equation may be developed, e.g., based upon empirical testing. The duration of States 2 and 4 (Time Overlap) may also be fixed or adjusted during manufacturing or servicing, and/or dynamically during operation of the apparatus 10, if desired, in a similar manner.

Optionally, one or more check valves (not shown) may be provided in the exhaust line (e.g., within the exhaust passage 68 in the air manifold 16 or coupled to the exhaust opening(s) 92). Such a check valve may stop the sieve beds 12 from "breathing," e.g., when the apparatus 10 is not operational, and is subjected to changing barometric pressure and/or temperature. For example, if SMC DXT valves are provided for the exhaust air control valves $20_e$, they may act as check valves. Without pilot pressure, however, the exhaust air control valves $20_e$ may leak. Relatively small springs (not shown) may be added to these valves to prevent such leakage.

Alternatively, one or more valves (not shown) may be provided in parallel with or instead of the purge orifice 81, i.e., in lines extending between the oxygen inlet/outlet ends 34 of the sieve beds 12. In this alternative, the apparatus 10 may be operated using a four (4) state cycle similar to that described above. However, the parallel valves may open during the overlap time or at the end of the pressure cycle in order to actively control pressurization or purging of the sieve beds 12.

With concentrated oxygen stored in the reservoir 18 and/or with the sieve beds 12 separating oxygen from ambient air, the apparatus 10 may be used to deliver concentrated oxygen to a user. As described above, the controller 22 may be coupled to the oxygen delivery valve 116 for opening and closing the oxygen delivery valve 116 to deliver oxygen from the reservoir 18 to a user of the apparatus 10.

In an exemplary embodiment, the controller 22 may periodically open the oxygen delivery valve 116 for predetermined "pulses." During pulse delivery, a "bolus" of oxygen is delivered to the user, i.e., the oxygen delivery valve 116 is opened for a predetermined pulse duration, and thereafter closed until the next bolus is to be delivered. Alternatively, the controller 22 may open the oxygen delivery valve 116 for continuous delivery, e.g., throttling the oxygen delivery valve 116 to adjust the flow rate to the user. In a further alternative, the controller 22 may periodically open and throttle the oxygen delivery valve 116 for a predetermined time to vary the volume of the bolus delivered.

In one embodiment, the controller 22 may open the oxygen delivery valve 116 after the controller 22 detects an event, such as detecting when the user begins to inhale. When the event is detected, the oxygen delivery valve 116 may be opened for the predetermined pulse duration. In this embodiment, the pulse frequency or spacing (time between successive opening of the oxygen delivery valve 116) may be governed by and correspond to the breathing rate of the user (or other event spacing). The overall flow rate of oxygen being delivered to the user is then based upon the pulse duration and pulse frequency.

Optionally, the controller 22 may delay opening the oxygen delivery valve 116 for a predetermined time or delay after the user begins to inhale, e.g., to maximize delivery of oxygen to the user. For example, this delay may be used to maximize delivery of oxygen during the "functional" part of inhalation. The functional part of the inhalation is the portion where most of the oxygen inhaled is absorbed into the bloodstream by the lungs, rather than simply used to fill anatomical dead space, e.g., within the lungs. It has been found that the functional part of inhalation may be approximately the first half and/or the first six hundred milliseconds (600 ms) of each breath. Thus, the predetermined delay after detecting inhalation may be between about twenty and one hundred fifty milliseconds (20-150 ms.).

Thus, it may particularly useful to detect the onset of inhalation early and begin delivering oxygen quickly in order to deliver oxygen during the functional part of inhalation. A user breathing through their nose may generate relatively strong pressure drops, e.g., about one centimeter of water (1 cmH2O), within the cannula. However, if the user breathes through their mouth, they may only generate pressure drops on the order of 0.1 centimeter of water (0.1 cmH2O).

For example, assuming an excitation voltage of five volts (5 V), the output sensitivity of the pressure sensor 122 may be about 320 μV/cmH2O. Consequently, a pressure drop of 0.1 V (e.g., from inhalation through the mouth). If the controller 22 includes an amplifier (not shown) having a gain of one thousand (1,000), the amplifier would create an amplified signal of about thirty two millivolts (322 mV), which may provide six (6) counts in a ten (10) bit five volt (5 V) analog to digital (A/D) converter.

As explained above, the pressure sensor 122 may exhibit drift problems, making it difficult for the controller 22 to identify the beginning of an inhalation and open the oxygen delivery valve 116. One solution is to reset or zero the pressure sensor 122 when the apparatus 10 is off. However, the pressure sensor 122 may be temperature sensitive such that the pressure sensor 122 may create a drift greater than the trigger level. Alternatively, as described above, a small valve (not shown) may be coupled to the pressure sensor 122 that may be opened periodically to reset or zero the pressure sensor 122, e.g., while the oxygen delivery valve 116 is open and delivering oxygen. In a further alternative, also described above, a relatively small orifice may be provided between the pressure sensor 122 and the oxygen delivery valve 116 that may allow the pressure sensor 122 to reset or zero during oxygen delivery, e.g., during a pulse as short as one hundred milliseconds (100 ms.).

In yet a further alternative, the controller 22 may include hardware and/or software that may filter the signals from the pressure sensor 122 to determine when the user begins inhalation. In this alternative, the controller 22 may need to be sufficiently sensitive to trigger the oxygen delivery valve 116 properly, e.g., while the user employs different breathing techniques. For example, some users may practice pursed lip breathing, e.g., inhaling through their nose and exhaling through pursed lips. During this breathing technique, the controller 22 will not detect an expiratory signal that will indicate that inhalation is about to begin.

The filtering algorithm may also need to distinguish between the onset of inhalation and a declining rate of exhalation, which may otherwise mislead the controller 22 into triggering oxygen delivery during a long period of exhalation (which is wasteful). In addition or alternatively, the filtering algorithm of the controller 22 may need to "hold off" during long breaths, e.g., to avoid delivering multiple pulses during a relatively long single inhalation. For example, if the controller 22 is configured to open the oxygen delivery valve 116 if it detects a pressure drop below a predetermined threshold, it may open the oxygen delivery valve 116 twice during a single inhalation (which may also be wasteful). In this situation, the filtering algorithm may include a hold-off time after inhalation is sensed, e.g., at least about 1.5 seconds.

Alternatively, the controller 22 may open at a pulse frequency that may be fixed, i.e., independent of the user's breathing rate, or that may be dynamically adjusted. For example, the controller 22 may open the oxygen delivery valve 116 in anticipation of inhalation, e.g., based upon monitoring the average or instantaneous spacing or frequency of two or more previous breaths. In a further alternative, the controller 2 may open and close the oxygen delivery valve 116 based upon a combination of these parameters, e.g., based upon the user's breathing rate, but opening the oxygen delivery valve 116 if a minimum predetermined frequency is not met.

For pulse delivery, the pulse duration may be based upon the dose setting selected by the user. In this way, substantially the same volume of oxygen may be delivered to the user each time the oxygen delivery valve 116 is opened, given a specific dose setting. The dose setting may be a quantitative or qualitative setting that the user may select. A qualitative dose setting may involve a dial or one or more buttons (e.g., on the user interface 144) that allow the user to select a level, e.g., on a scale from one to ten (1-10) or from ranging from Minimum to Maximum. The controller 22 may relate the qualitative setting with a desired flow rate or bolus size, e.g., relating to the maximum flow capacity of the apparatus 10.

For example, the settings may correspond to points within the range at which the apparatus 10 may supply concentrated oxygen, e.g., between zero and one hundred percent (0-100%) of a maximum capacity of the apparatus 10. For example, a maximum flow rate (or equivalent flow rate of pure oxygen) for the apparatus 10 may be used, e.g., between about six and sixteen liters per minute (6-16 lpm). Alternatively, a maximum bolus volume may be used, e.g., between about ten and one hundred fifty milliliters (10-150 mL) or between about ten and eighty milliliters (10-80 mL).

A quantitative setting may allow a user to select a desired flow rate (e.g., in lpm), which may be an actual concentrated oxygen flow rate or an equivalent pure oxygen flow rate, or a desired bolus volume (e.g., in milliliters). The flow rates or volumes available for selection may also be limited by the capacity of the apparatus 10, similar to the qualitative settings. Additional information on using a volume-based dose setting system, rather than implying equivalency to continuous flow, may be found in *Characteristics of Demand Oxygen Delivery Systems: Maximum Output and Setting Recommendations*, by P. L. Bliss, R. W. McCoy, and A. B. Adams, Respiratory Care 2004;49(2) 160-165, the entire disclosure of which is incorporated by reference herein.

As the dose setting is increased, the pulse duration may be increased, e.g., from about fifty to five hundred milliseconds (50-500 ms) to deliver a predetermined bolus during each pulse. If the user's breathing rate remains substantially constant, the pulse frequency may also remain substantially constant, thereby increasing the overall flow rate being delivered to the user. During actual use, however, the user's breathing rate may change, e.g., based upon level of activity, environmental conditions, and the like. For example, breathing rates for lung disease patients may vary from about thirteen to forty (13-40) breaths per minute, or from about eighteen to thirty (18-30) breaths per minute. Therefore, the apparatus 10 may be capable of delivering these frequencies of pulses to the user.

Because of the relatively small size of a portable concentrator, such as apparatus 10, conditions may occur in which the dose setting and user's breathing rate exceed the capacity of the apparatus 10. Thus, for any given dose setting, i.e., particular volume (e.g., mL) per breath, the apparatus 10 may have a maximum breathing rate at which the apparatus 10 may deliver oxygen at the desired dose setting.

If the maximum breathing rate for a particular dose setting is exceeded, the apparatus 10 may respond in one or more ways. For example, the apparatus 10 may include an alarm, e.g., a visual and/or audio alarm, that may alert the user when such an event occurs. This may alert the user, and, if necessary, the user may slow their breathing rate, e.g., by resting and the like.

In addition or alternatively, the apparatus 10 may change the delivery parameters to maintain delivery at or near the maximum flow rate capacity of the apparatus 10, e.g., about 900 mL/min. or about 1,200 mL/min. To achieve this, the controller 22 may calculate the bolus size that may be delivered given the user's breathing rate (e.g., dividing the maximum flow rate by the breathing rate or using a lookup table), and adjust the pulse duration accordingly (and/or throttle the oxygen delivery valve 116). For example, assume the controller 22 detects that the user has a breathing rate of about twenty three breaths (23) per minute over a predetermined time, e.g., the most recent thirty seconds (30 s.), and the dose setting delivers forty millimeters (40 mL) per breath. The resulting flow rate, 920 mL/min. would exceed the ability of a 900 mL/min. capacity apparatus. Consequently, the controller 22 may reduce the pulse duration to reduce the flow rate at or below 900 mL/min, e.g., by reducing the pulse duration by at least about (1-900/920) or about percent two percent (2%).

When selecting volumetric flow rates for pulse delivery, one or more additional factors may also be considered. For example, higher flow rates may create greater back pressure in the cannula, making control of the flow more difficult, especially in a relatively low pressure system, such as a portable oxygen concentrator, similar to the apparatus 10 described herein.

Optionally, the apparatus 10 may be operated in a manner that may maximize efficiency, e.g., to reduce power consumption and extend battery life of the apparatus 10. This may enhance the mobility of the user, e.g., allowing them to remain independent of an external power source for longer periods of time.

Several variables may be relevant to determine how much energy may be required to operate the apparatus 10. The independent variable is the speed or power of the compressor 14, which may consume as much as ninety five percent (95%) of the power used by the apparatus 10. The speed of the motor 40 of the compressor 14 may be controlled by the controller 22, and is essentially a pulse width modulation ("PWM") of the power of the battery 148, i.e., the more power required, the higher the duty cycle of the PWM.

Closed loop speed or torque control of the motor 40 may be used, but may not be necessary. During the process cycle, as pressure increases, the speed of the motor 40 of the compressor 14 may be reduced because of the higher torque requirement. This may result in the total energy required being substantially leveled, minimizing current peaks.

The PWM may be expressed as a percentage from zero to one hundred (0-100%), zero corresponding to the compressor 14 being off and one hundred percent corresponding to the compressor 14 operating at its maximum speed. In practice, there is a minimum value attainable, below which the compressor 14 may not turn, and therefore, the true range may be about forty to one hundred percent (40-100%). The equations here assume the relationships are linear, which may provide sufficient approximation. Alternatively, more detailed equations may be developed based upon theoretical or empirical calculations, e.g., which may be implemented using a non-linear equation or a lookup table, e.g., within memory of the controller 22.

PWM may be controlled by monitoring reservoir pressure (pressure within the reservoir 18) and controlling the motor 40 of the compressor to maintain a target reservoir pressure. For example, the controller 22 may be coupled to pressure sensor 114 within the reservoir to monitor the reservoir pressure, and the controller 22 may adjust the PWM of the motor 40 accordingly. The target reservoir pressure may be static, e.g., set during manufacturing or service, or may be dynamic, e.g., changed to maintain a target oxygen purity and/or other parameter(s), as described further elsewhere herein. Alternatively, multiple variables may be monitored and the motor 40 controlled to maintain the multiple variables at selected targets.

For example, a target reservoir pressure may be selected based upon dose setting and user breathing rate. In exemplary embodiments, the target reservoir pressure may be between about five and fifteen pounds per square inch (5-15 psi) or between about six and twelve pounds per square inch (6-12 psi). Optionally, the target pressure may be adjusted based upon other parameters, such as oxygen purity, as explained further below.

The user breathing rate may be determined by the controller 22, e.g., based upon pressure readings from the pressure sensor 122. The pressure sensor 122 may detect a reduction in pressure as the user inhales (e.g., drawing oxygen from the recesses 133, 137 and channel 135, shown in FIGS. 8A and 8B). The controller 22 may monitor the frequency at which the pressure sensor 122 detects the reduction in pressure to determine the breathing rate. In addition, the controller 22 may also use the pressure differential detected by the pressure sensor 120.

As the dose setting is increased, the user breathing rate increases, and/or the battery voltage drops, the product reservoir pressure may tend to drop. To compensate for this pressure drop, PWM may be increased. Thus, a target reservoir pressure may be chosen and the controller 22 may implement a control loop to maintain this target reservoir pressure.

In addition, the oxygen sensor 118 may also be used to monitor the purity of the oxygen being delivered from the reservoir 18. Changes in the oxygen purity may be affected by the condition of the sieve material within the sieve beds 12, the temperature and/or the humidity of the ambient air being drawn into the apparatus 10 to charge the sieve beds 12, and the like. The controller 22 may have a set target oxygen purity stored in memory, e.g., between about 85-93%, such as 88%, and may monitor the purity detected by the oxygen sensor 118. If the oxygen purity decreases below the target oxygen purity, the controller 22 may increase the target reservoir pressure to compensate and increase the oxygen purity. This may trigger the controller 22 increasing PWM based upon the control loop used by the controller 22 to maintain the new target reservoir pressure.

Thus, the controller 22 may modify PWM, i.e., the speed of the motor 40 of the compressor 14, to maintain the reservoir near its target pressure, which the controller 22 may modify based upon the parameters monitored by the controller 22.

The maximum oxygen production rate is dependent upon the speed of the compressor 14, which, in turn, is dependent upon the input voltage from the batteries 148. To operate effectively, it is desirable for the apparatus 10 to operate at or close to the target parameters, even as the batteries 148 begin to deplete their charges. For a 4S4P Li-Ion battery, the voltage at the end of the battery's charge may be about eleven Volts (11 V). When this battery is fresh (or when the apparatus 10 is connected to an external power source), by comparison, the voltage may be as much as 16.8 Volts. To prevent excess oxygen generation when the batteries 148 are fully charged, it may be desirable to impose a maximum speed for the compressor 14, e.g., not more than about 2,500 rpm. Alternatively, the controller 22 may allow this maximum speed to be occasionally exceeding within a predetermined margin of safety, in order to reduce the risk of damage to the compressor 14.

By way of example, for an apparatus 10 delivering up to sixty milliliters (60 mL) per breath, an exemplary flow rate of about eight liters per minute (8 lpm, or about 133 mL/s.) may be used. The equivalent volume of 88% oxygen gas is about seventy milliliters (70 mL), and the pulse duration would be about 0.53 second. If the apparatus 10 is capable of generating up to about 1200 mL/min, the maximum breathing rate at maximum dose setting would be about seventeen (17) breaths per minute. Assuming an I:E ratio of 1:2 and that the first fifty percent (50%) of each of the user's breaths are functional (and not filling dead-space), the minimum available time would be 0.60 second. At higher breathing rates, the maximum pulse volume (and pulse duration) would be lower because of the maximum production rate.

Since the apparatus 10 may operate at relatively low pressures, e.g., between about five and twelve pounds per square inch (5-12 psi), the flow through any controlling passage within the apparatus 10 will not be sonic. Consequently, if the back pressure of the apparatus 10 varies, e.g., due to the cannula or tubing connected by the user, it may cause changes in the flow rate of oxygen delivered to the user. At eight liters per minute (8 lpm), the resistance of cannula may be between about 0.7 and two pounds per square inch (0.7-2 psi), e.g., for a Hudson cannula or a TTO catheter was approximately. This increased back pressure may reduce the flow rate of oxygen delivered to the user by as much as twenty five percent (25%).

To allow for variance in both reservoir pressure and downstream pressure (pressure from the reservoir 18 to the user via the cannula), the following algorithm may be employed. The valve "on time" may be adjusted to maintain a fixed pulse volume (as set by the selected dose setting). The reservoir pressure may be measured during the time that the oxygen delivery valve 166 is off, and the pressure across the oxygen delivery valve 116 may be measured, e.g., using pressure sensor 120, while the oxygen delivery valve 116 is open.

Valve On Time or the pulse duration (Time Delivery in Table 3) may be set as a factor of dose setting adjusted by oxygen purity to get actual volume, reservoir pressure, and pressure drop across the oxygen delivery valve 116. The equations that may be used for these calculations are shown in Table 3, which includes exemplary control parameters that may be used to operate the apparatus 10.

TABLE 3

| Parameter | Type | Units | Range | Start Value | Definition |
|---|---|---|---|---|---|
| Time Pressurize | Calc. | sec | 4-12 | 6 | Pressure Product PsiF × Time Pressurize Gain + Time Pressurize Offset. This parameter may be calculated from Target pressure instead of measured. Shorter time creates lower pressure. |
| Time Pressurize Gain | Set | sec/psi | 0-(−.6) | −0.3 | |
| Time Pressurize Offset | Set | sec | 0-20 | 9 | |
| Time Overlap | Set | sec | 0-2 | 0.2 | |
| Reservoir Pressure | Meas | PSI | 0-15 | 8 | Measured from Product Trans. from sensor 114 in reservoir with oxygen delivery valve 116 closed. |
| Pressure Product | Calc | PSI | 0-5 | 8 | The controller 22 may include a low pass filter with a time constant about thirty seconds (30 s.) to filter out breath and cycle variations. |
| Pressure Valve Psi | Meas | PSI | 0-15 | | Measured from Product Trans. using sensor 114 with oxygen delivery valve 116 open. The measurement may be delayed after oxygen delivery valve 116 is opened, e.g., at least about 100 ms to avoid artifact. |
| Pressure Valve PsiF | Calc | PSI | 0-15 | 7 | The controller 22 may include a low pass filter, e.g., with a time constant of about 100 ms, to filter out noise. |
| O2 Percent | Meas | | 21-96 | | Measured from oxygen sensor 118. |
| O2 Percent F | Calc | | 21-96 | 80 | The controller may include a low pass filter, e.g., with a time constant of about 30 s., to eliminate cycle variations. |
| O2 Percent Target | Set | | 75-92 | | Control Algorithm Target O2Percent (resolution .01) |
| Pulse Vol mL | Set | mL | 10-60 | | Set by patient, equivalent dose of 100% O2 gas |
| Pulse Vol Act mL | Calc | mL | 11-80 | | Actual Delivered Volume = 79/(O2PercentTarget − 21) × PulseVolmL could use O2Percent instead of Target, but may be less stable, as volume will go up as % goes down, which in turn could cause % to decrease further |
| Time Resp Sec | Meas | sec | 1-5 | | Measured time between last two breaths |
| Time Resp Sec F | Calc | sec | 1.5-5 | 3 | Low pass filtered 5-10 breaths |
| Production Vol mL | Calc | mL/min | 0-1500 | | Pulse Vol mL × 60/Time Resp Sec F |
| Pressure Product Target Psi | Calc | PSI | 3-12 | | (Pressure Product Target Gain × Production Vol mL + Pressure Product Target Offset) × O2 Factor |
| Pressure Product Target Gain | Set | PSI/mL/min | 0-.03 | 0.01 | |
| Pressure Product Target Offset | Set | PSI | 0-12 | 3 | |
| O2 Factor | Calc | none | .5-1.5 | 1 | O2 Factor(old value) × (O2 Percent Target − O2 Percent F) × O2 Factor Gain |
| O2 Factor Gain | Set | none | | | Depends on how often updated, but should change gradually, over 1-20 minutes |

TABLE 3-continued

| Parameter | Type | Units | Range | Start Value | Definition |
|---|---|---|---|---|---|
| Motor Pwm | Calc | | min-100 | | Motor Pwm(old value) × (Pressure Product Psi F − Pressure Product Target Psi) × Motor Pwm Gain. Closed loop control to obtain PressureProductTargetPSI |
| Motor Pwm Min | Set | | 0-50 | 50 | Minimum and startup PWM value, to avoid non-rotating pump |
| Motor Pwm Gain | Set | | | | Sets how rapid motor control changes are - depends on how often updated - control may change somewhat rapidly, because product pressure is already filtered. |
| Time Delivery Msec | Calc | Msec | 100-700 | | (Pulse Vol Act mL × Pressure Valve Psi F^0.5 × Time Delivery Gain)/ ((Pressure Product Psi + 14.2). Time to hold the delivery valve open - needs more empirical validation |
| Time Delivery Gain | Set | none | 50-200 | 100 | |

In an alternative embodiment, a valve (not shown) may be provided that may act similar to a pressure regulator. Instead of controlling the downstream gauge pressure, it may control a pressure drop across an orifice placed inline downstream with the delivery valve. In this way, regardless of downstream pressure, the same flow rate may be delivered, and the resulting volume at a selected pulse duration may be substantially constant.

When a user decides to turn off or shut down the apparatus 10, e.g., by depressing an on/off switch or depressing a "button" on a touch screen, e.g., on the user interface 144, it may be desirable for the apparatus 10 to complete a procedure automatically to protect the apparatus 10. For example, if pressurized air remains in the sieve beds 12 after shutdown, water in the air may condense or otherwise be absorbed by the sieve material, which may damage the sieve material. It may also be desirable to substantially isolate the sieve beds 12 from atmospheric conditions, e.g., to prevent the sieve beds 12 from "breathing" when the apparatus 10 encounters changing barometric pressure and/or temperature. Any such breathing may introduce air into or evacuate air out of the sieve beds 12, which may introduce moisture into the sieve material.

When the apparatus 10 is being turned off, the oxygen delivery valve 116 may be closed to discontinue delivery of oxygen from the reservoir 18. The supply air control valves $20_s$ may be automatically closed (either actively or as the default when electrical power is turned off), e.g., while the exhaust air control valves $20_e$ are opened. After a first predetermined time, e.g., between about one hundred and three hundred milliseconds (100-300 ms), the compressor 14 may be turned off. Leaving the compressor 14 operating momentarily after closing the supply air control valves $20_s$ may leave residual pressure within the air manifold 16, which may enhance holding the air control valves $20_s$ closed for an extended period of time. This pressure may leak slowly over time.

After a second predetermined time, e.g., between about nine and twelve seconds (9-12 s), allowing any pressurized air to be exhausted from the sieve beds 12, the exhaust air control valves $20_e$ may be closed (either actively or as the default when electrical power is turned off).

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

We claim:

1. A portable oxygen concentrator, comprising:
a plurality of sieve beds adapted to absorb nitrogen from air, including a first sieve bed and a second sieve bed, each sieve bed in the plurality of sieve beds comprising an air inlet/outlet end and an oxygen inlet/outlet end;
a reservoir communicating with the oxygen inlet/outlet ends of the plurality of sieve beds and adapted to store oxygen from the plurality of sieve beds;
a compressor adapted to deliver air at one or more desired pressures to the air inlet/outlet ends of the plurality of sieve beds;
a set of valves disposed between the compressor and the air inlet/outlet ends of the plurality of sieve beds;
a pressure sensor adapted to measure a reservoir pressure within the reservoir;
an oxygen sensor adapted to measure an oxygen purity within the reservoir before delivery to a user; and
a controller coupled to the valves and adapted to selectively open and close the valves to alternately charge the first sieve bed while purging the second sieve bed, and charge the second sieve bed while purging the first sieve bed, wherein the controller is coupled to the pressure sensor and is adapted to monitor the reservoir pressure, wherein the controller adjusts a charge/purge duration that the first and the second sieve beds are alternately purged at least partially based upon the reservoir pressure, and wherein the controller is coupled to the oxygen sensor and adapted to adjust the charge/purge duration at least partially based upon the oxygen purity.

2. The portable oxygen concentrator of claim 1, further comprising a purge orifice communicating continuously between the oxygen inlet/outlet ends of the first and the second sieve beds such that oxygen flows from a sieve bed being charged to a sieve bed being purged.

3. The portable oxygen concentrator of claim 2, wherein the controller selectively opens and closes the valves to simultaneously charge the first and the second sieve beds to allow gas to pass via the purge orifice from a sieve bed just charged into a sieve bed just purged, the simultaneous charging of the first and the second sieve beds occurring between charging the first sieve bed, while purging the second sieve bed, and charging the second sieve bed, while purging the first sieve bed.

4. The portable oxygen concentrator of claim 1, wherein the controller shortens the charge/purge duration responsive to the reservoir pressure increasing, and lengthens the charge/purge duration responsive to the reservoir pressure decreasing.

5. The portable oxygen concentrator of claim 1, wherein the controller increases the charge/purge duration responsive to the oxygen purity decreasing.

6. The portable oxygen concentrator of claim 1, further comprising a delivery valve adapted to communicate with the reservoir and coupled to the controller, and wherein the controller selectively opens the delivery valve to deliver gas from the reservoir to a user, and wherein the controller further samples the oxygen purity only when the delivery valve is closed.

7. A portable oxygen concentrator, comprising:
a plurality of sieve beds including a first bed and a second sieve bed;
a compressor adapted to deliver air to the plurality of sieve beds;
a set of control valves disposed between the compressor and the plurality of sieve beds;
a reservoir communicating with the plurality of sieve beds and adapted to store oxygen from the plurality of sieve beds;
a delivery valve adapted to communicate with the reservoir;
a pressure sensor adapted to measure a reservoir pressure within the reservoir and to measure a pressure drop across the delivery valve; and
a controller coupled to the control valves and adapted to selectively open and close the valves to alternately charge and purge the first and the second sieve beds, wherein the controller is coupled to the pressure sensor and is adapted to monitor the reservoir pressure and the pressure drop across the delivery valve, wherein the controller is coupled to the delivery valve and adapted to selectively open the delivery valve for predetermined pulse durations to deliver pulses of gas from the reservoir to a user, and wherein the controller adjusts the pulse durations based at least partially upon the reservoir pressure and the pressure drop across the delivery valve.

8. The portable oxygen concentrator of claim 7, further comprising an oxygen sensor adapted to measure an oxygen purity within the reservoir before delivery to a user, and wherein the controller is coupled to the oxygen sensor and adjusts the pulse durations at least partially based upon the oxygen purity.

9. The portable oxygen concentrator of claim 8, wherein the controller increases the pulse duration responsive to the oxygen purity decreasing below a predetermined threshold.

10. The portable oxygen concentrator of claim 8, wherein the controller selectively opens the delivery valve to deliver gas from the reservoir to a user, and wherein the controller further measures the oxygen purity only when the delivery valve is closed.

11. The portable oxygen concentrator of claim 7, further comprising a purge orifice adapted to communicate continuously between the oxygen inlet/outlet ends of the first and the second sieve beds such that oxygen flows from a sieve bed being charged to a sieve bed being purged.

12. The portable oxygen concentrator of claim 11, wherein the controller selectively opens and closes the valves to simultaneously charge the first and the second sieve beds to allow gas to pass via the purge orifice from a sieve bed just charged into a sieve bed just purged, the simultaneous charging of the first and the second sieve beds occurring between alternately charging and purging of the first and the second sieve beds.

13. The portable oxygen concentrator of claim 1, wherein the controller shortens a charge/purge duration that the first and second sieve beds are alternately charged and purged responsive to the reservoir pressure increasing, and lengthens the charge/purge duration responsive to the reservoir pressure decreasing.

14. A method for concentrating oxygen comprising:
providing a portable apparatus comprising a first sieve bed and a second sieve bed, each sieve bed including a first end and a second end, and a reservoir communicating with the second ends of the first and the second sieve beds;
cyclically charging a first sieve bed while purging a second sieve bed, and charging the second sieve bed while purging the first sieve bed for charge/purge durations, whereby oxygen passes from the first and the second sieve beds during charging into the reservoir;
monitoring a pressure within the reservoir;
adjusting the charge/purge durations based at least partially upon the pressure within the reservoir;
delivering oxygen from the reservoir;
monitoring an oxygen purity of the oxygen delivered from the reservoir; and
adjusting the charge/purge durations based at least partially upon the oxygen purity.

15. The method of claim 14, wherein oxygen is delivered from the reservoir in pulses having a pulse duration.

16. The method of claim 15, further comprising:
measuring a back pressure of the oxygen delivered from the reservoir; and
adjusting the pulse duration based at least partially upon the back pressure of the oxygen delivered from the reservoir.

17. The method of claim 14, further comprising:
delivering oxygen from the reservoir in pulses having a pulse duration; and
adjusting the pulse duration based at least partially upon the pressure within the reservoir.

18. The method of claim 17, further comprising:
measuring a back pressure of the oxygen delivered from the reservoir; and
further adjusting the pulse duration based at least partially upon the back pressure of the oxygen delivered from the reservoir.

19. A method for concentrating oxygen comprising:
providing a portable apparatus comprising a first sieve bed and a second sieve bed, each sieve bed including a first end and a second end, and a reservoir communicating with the second ends of the first and the second sieve beds;
cyclically charging a first sieve bed while purging a second sieve bed, and charging the second sieve bed while purging the first sieve bed for charge/purge durations, whereby oxygen passes from the first and the second sieve beds during charging into the reservoir;
monitoring a pressure within the reservoir;

adjusting the charge/purge durations based at least partially upon the pressure within the reservoir;

delivering oxygen from the reservoir in pulses having a pulse duration; and adjusting the pulse duration based at least partially upon the pressure within the reservoir.

20. The method of claim 19, further comprising:

measuring a back pressure of the oxygen delivered from the reservoir; and further adjusting the pulse duration based at least partially upon the back pressure of the oxygen delivered from the reservoir.

21. A portable oxygen concentrator, comprising:

an input device adapted to set a pulse dose amount;

a plurality of sieve beds adapted to absorb nitrogen from air, including a first sieve bed and a second sieve bed, each sieve bed in the plurality of sieve beds comprising an air inlet/outlet end and an oxygen inlet/outlet end;

a reservoir communicating with the oxygen inlet/outlet ends of the plurality of sieve beds and adapted to store oxygen from the plurality of sieve beds;

a compressor adapted to deliver air at one or more desired pressures to the air inlet/outlet ends of the plurality of sieve beds;

a set of valves disposed between the compressor and the air inlet/outlet ends of the plurality of sieve beds;

a breath rate sensor adapted to detect a user's breath rate; and a controller coupled to the valves and adapted to selectively open and close the valves to alternately charge the first sieve bed while purging the second sieve bed, and charge the second sieve bed while purging the first sieve bed, and wherein the controller controls an operating speed of the compressor at least partially based on the pulse dose amount and the breath rate sensor.

22. The portable oxygen concentrator of claim 21, wherein the controller determines patient demand as a product of the dose amount and the breath rate, and wherein the controller determines a target reservoir pressure based on the patient demand.

23. The portable oxygen concentrator of claim 22, further comprising a pressure sensor adapted to measure a reservoir pressure within the reservoir, and wherein the controller controls the operating speed of the compressor based on a comparison of the reservoir pressure and the target reservoir pressure.

24. The portable oxygen concentrator of claim 21, wherein the breath rate sensor is a pressure sensor or a flow rate sensor operatively coupled to an output of the reservoir or an output of the reservoir.

25. The portable oxygen concentrator of claim 21, further comprising an oxygen sensor, and wherein the controller controls (a) the charge/purge duration that the first and the second sieve beds are alternately purged, (b) the operating speed of the compressor, or both (a) and (b) at least partially based on an output from the oxygen sensor.

26. The portable oxygen concentrator of claim 21, wherein the controller controls the operating speed of the compressor by pulse width modulation of signals provided to the compressor.

27. The portable oxygen concentrator of claim 21, wherein the controller controls the charge/purge duration that the first and the second sieve beds are alternately purged at least partially based upon the reservoir pressure.

28. The portable oxygen concentrator of claim 27, wherein the controller shortens the charge/purge duration responsive to the reservoir pressure increasing, or lengthens the charge/purge duration responsive to the reservoir pressure decreasing.

29. A method for concentrating oxygen comprising providing a portable apparatus comprising a first sieve bed and a second sieve bed, each sieve bed including a first end and a second end, a compressor operatively coupled to the first ends of the first and the second sieve beds, a set of valves disposed between the compressor and the first ends of the first and the second sieve beds, and a reservoir operatively coupled to the second ends of the first and the second sieve beds;

controlling the set of valves to cyclically charge a first sieve bed while purging a second sieve bed, and charging the second sieve bed while purging the first sieve bed for charge/purge durations, whereby oxygen passes from the first and the second sieve beds during charging into the reservoir;

setting a pulse dose amount for oxygen to be delivered to a user;

monitoring a user's breath rate; and controlling an operating speed of the compressor at least partially based on the pulse dose amount and the breath rate sensor.

30. The method of claim 29, further comprising:

determining patient demand as a product of the dose amount and the breath rate; and determining a target reservoir pressure based on the patient demand.

31. The method of claim 30, further comprising:

monitoring a reservoir pressure within the reservoir; and controlling the operating speed of the compressor based on a comparison of the reservoir pressure and the target reservoir pressure.

32. The method of claim 29, where monitoring the breath rate sensor is accomplished by monitoring a pressure or a flow of gas in the reservoir or at an output of the reservoir.

33. The method of claim 29, further comprising:

monitoring an oxygen purity of the oxygen passing from the first and the second sieve beds oxygen sensor; and controlling (a) the operating speed of the compressor, (b) the charge/purge duration that the first and the second sieve beds are alternately purged, or both (a) and (b) at least partially based on an output from the oxygen purity.

34. The method of claim 29, wherein controlling the operating speed of the compressor as accomplished by pulse width modulation of signals provided to the compressor.

35. The method of claim 29, further comprising:

monitoring a reservoir pressure within the reservoir; and controlling the charge/purge duration that the first and the second sieve beds are alternately purged at least partially based upon the reservoir pressure.

36. The method of claim 35, wherein controlling the charge/purge duration that the first and the second sieve beds are alternately purged at least partially based upon the reservoir pressure includes (a) shortens the charge/purge duration responsive to the reservoir pressure increasing, or (b) lengthens the charge/purge duration responsive to the reservoir pressure decreasing.

* * * * *